United States Patent
Green et al.

(10) Patent No.: US 12,510,676 B2
(45) Date of Patent: Dec. 30, 2025

(54) METHOD AND SYSTEM FOR NAVIGATION OF A VEHICLE

(71) Applicant: Raytheon Systems Limited, Harlow (GB)

(72) Inventors: Sebastian Samuel Lounes Green, Harlow (GB); Michael Stephen Richard Hill, Harlow (GB); Jonathan Andrew Blenkharn, Harlow (GB)

(73) Assignee: Raytheon Systems Limited, Harlow (GB)

( * ) Notice: Subject to any disclaimer, the term of this patent is extended or adjusted under 35 U.S.C. 154(b) by 109 days.

(21) Appl. No.: 18/541,232

(22) Filed: Dec. 15, 2023

(65) Prior Publication Data

US 2024/0201399 A1   Jun. 20, 2024

(30) Foreign Application Priority Data

Dec. 16, 2022   (GB) ..................................... 2219074

(51) Int. Cl.
*G01S 19/49* (2010.01)
*G01S 19/39* (2010.01)

(52) U.S. Cl.
CPC ............ *G01S 19/49* (2013.01); *G01S 19/393* (2019.08)

(58) Field of Classification Search
CPC ............................... G01S 19/49; G01S 19/393
See application file for complete search history.

(56) References Cited

U.S. PATENT DOCUMENTS

| | | |
|---|---|---|
| 2010/0007550 A1 | 1/2010 | Nagamiya et al. |
| 2010/0169006 A1 | 7/2010 | Ueda et al. |
| 2015/0204983 A1 | 7/2015 | Georgy et al. |
| 2017/0074660 A1 | 3/2017 | Gann et al. |
| 2018/0095159 A1* | 4/2018 | Barrau ................ G06F 17/11 |
| 2021/0129880 A1 | 5/2021 | Chen et al. |

OTHER PUBLICATIONS

Combined Search and Examination Report under Sections 17 & 18(3) in GB Application No. GB2219074.8 dated Jun. 16, 2023, 2 pages.
European Search Report dated May 29, 2024 in connection with European Patent Application No. 23214349.5, 11 pages.

* cited by examiner

*Primary Examiner* — Rodney A Butler

(57) ABSTRACT

An iterative method for navigation of a vehicle includes receiving a set of satellite navigation data for the vehicle, a validity time of the set of satellite navigation data, and a series of sets of inertial navigation data. The method also includes processing the received set of satellite navigation data together with a current position, velocity and attitude value of the vehicle and a previous prediction of error states to generate an estimated position, velocity and attitude and a prediction of error states. The method further includes carrying out a catch up process and, for subsequently received sets of inertial navigation data, iteratively using each received set of inertial navigation data and the new updated position, velocity and attitude value of the vehicle to calculate a new updated position, velocity and attitude value of the vehicle.

20 Claims, 5 Drawing Sheets ary time, storing received sets of inertial navigation data; at a second processing element: using a navigation filter algorithm, processing the received set of satellite navigation data together with a current position, velocity and attitude value of the vehicle, and a prediction of error states made by the navigation algorithm in a previous iteration, to generate an estimated position, velocity and attitude, and prediction of error states, of the vehicle; carrying out a catch up process comprising: obtaining a stored series of one or more sets of inertial navigation data comprising one or more sets of inertial navigation data which were received between the validity time and the completion of the processing the received set of satellite navigation data; using a set of inertial navigation data of the stored series which was the first set of inertial navigation data received after the validity time, and the estimated position, velocity and attitude of the vehicle, to calculate an updated position, velocity and attitude value of the vehicle; and for any remaining sets of inertial navigation data of the stored series, in turn, in order of reception, iteratively using each set of inertial navigation data and the updated position, velocity and attitude value of the vehicle to calculate a new updated position, velocity and attitude value of the vehicle; and sending the new updated position, velocity and attitude value of the vehicle to the first processing element; and at the first processing element, after receiving the new updated position and velocity value of the vehicle from the second processing element, for subsequently received sets of inertial navigation data, in turn, in order of reception, iteratively using each received set of inertial navigation data and the new updated position, velocity and attitude value of the vehicle to calculate a new updated position, velocity and attitude value of the vehicle; wherein the new updated position, velocity and attitude value of the vehicle at the validity time is used as the current position, velocity and attitude value of the vehicle by the navigation filter algorithm.

METHOD AND SYSTEM FOR NAVIGATION OF A VEHICLE

CROSS REFERENCE TO RELATED APPLICATION

This application claims priority to United Kingdom Patent Application No. 2219074.8 filed on Dec. 16, 2022, the disclosure of which is incorporated herein by reference in its entirety.

FIELD OF THE INVENTION

The present application relates to a method and system for navigation of vehicles, and in particular to a method and system for navigation of airborne vehicles.

BACKGROUND TO THE INVENTION

Vehicle navigation systems commonly use a combination of navigation data from an inertial navigation system and navigation data from a satellite positioning system, such as a Global Positioning System (GPS), in order to determine the position, velocity and attitude of the vehicle. Combining navigation data from these two different sources can improve the accuracy and reliability of the vehicle navigation system. The navigation data received over time from the two different sources is typically combined using a filter algorithm, such as a Kalman filter algorithm, to provide improved accuracy and stability, and to reduce drift in unstable conditions, such as when navigation data from the satellite positioning system is temporarily unavailable.

A problem which can arise in navigation systems of this type is that the filter algorithms produce outputs which are time sensitive and generally include complex mathematical methods which are highly computationally intensive and require a complex computing system such as a high specification multi-core processor and/or a complex operating system (OS) with a multi-threading capability to be carried out sufficiently quickly before the outputs are out of date. Such complex computing systems are costly, and are difficult and costly to qualify against safety critical reliability standards.

The inventors have devised the claimed invention in light of the above considerations. The embodiments described below are not limited to implementations which solve any or all of the disadvantages of the known approaches described above.

SUMMARY OF INVENTION

This Summary is provided to introduce a selection of concepts in a simplified form that are further described below in the Detailed Description. This Summary is not intended to identify key features or essential features of the claimed subject matter; variants and alternative features which facilitate the working of the invention and/or serve to achieve a substantially similar technical effect should be considered as falling into the scope of the invention.

The invention is defined as set out in the appended set of claims.

In a first aspect, the present disclosure provides an iterative method for navigation of a vehicle, the method comprising: at a first processing element: receiving a set of satellite navigation data for the vehicle; receiving a validity time of the set of satellite navigation data; and receiving a series of sets of inertial navigation data each indicating acceleration and angular rate of the vehicle; after the valid In an embodiment, comprising, at the first processing element: after the validity time, obtaining a previously calculated position, velocity and attitude value of the vehicle, and for sets of inertial navigation data received after the validity time and before receiving the new updated position, velocity and attitude value of the vehicle from the second processing element, in turn, in order of reception, iteratively using each received set of inertial navigation data and the position, velocity and attitude value of the vehicle to calculate a new position, velocity and attitude value of the vehicle.

In an embodiment, the storing received sets of inertial navigation data continues during the catch up process; and wherein the catch-up process further comprises obtaining a further stored series of one or more sets of inertial navigation data comprising one or more sets of inertial navigation data which were received during the catch up process, and for each set of inertial navigation data of the further stored series, in turn, in order of reception, iteratively using each set of inertial navigation data and the new updated position, velocity and attitude value of the vehicle to calculate a new updated position, velocity and attitude value of the vehicle.

In an embodiment, further comprising, during the catch up process, checking whether any further sets of inertial navigation data have been received during the catch up process, and if the checking indicates that any further sets of inertial navigation data have been received and not yet used to calculate a new updated position, velocity and attitude value of the vehicle, continuing the catch up process.

In an embodiment, further comprising, at the first processing element: after receiving the new updated position, velocity and attitude value of the vehicle from the second processing element, checking whether a set of inertial navigation data has been received since the new updated position, velocity and attitude value of the vehicle was sent by the second processing element; and if such a set of inertial navigation data has been received, using this set of inertial navigation data and the received new updated position, velocity and attitude value of the vehicle to calculate a new updated position, velocity and attitude value of the vehicle.

In an embodiment, further comprising: using a new updated position, velocity and attitude value of the vehicle to generate commands to manoeuvre the vehicle; and preferably, using each new updated position, velocity and attitude value of the vehicle to generate commands to manoeuvre the vehicle.

In an embodiment, further comprising: between the validity time and the first processing element receiving the new updated position, velocity and attitude value of the vehicle from the second processing element, using a new position and velocity value of the vehicle to generate commands to manoeuvre the vehicle; and after the first processing element receives the new updated position, velocity and attitude value of the vehicle from the second processing element, using a new updated position, velocity and attitude value of the vehicle to generate commands to manoeuvre the vehicle; and preferably, between the validity time and the first processing element receiving the new updated position, velocity and attitude value of the vehicle from the second processing element, using each new position, velocity and attitude value of the vehicle to generate commands to manoeuvre the vehicle; and after the first processing element receives the new updated position, velocity and attitude value of the vehicle from the second processing element, using each new updated position, velocity and attitude value of the vehicle to generate commands to manoeuvre the vehicle.

In an embodiment, the navigation filter algorithm comprises a square root filter or a Kalman filter.

In an embodiment, the satellite navigation data is GPS data.

In an embodiment, each set of inertial navigation data describes the acceleration of the vehicle in three orthogonal axes and angular rates of the vehicle about three orthogonal axes.

In an embodiment, the calculating an updated position, velocity and attitude value of the vehicle and/or a new position, velocity and attitude value of the vehicle is carried out using strapdown navigation equations.

In an embodiment, the set of satellite navigation data is received at the validity time of the set of satellite navigation data.

In an embodiment, the vehicle is an airborne vehicle.

In a second aspect, the present disclosure provides a method for navigation of a vehicle, the method comprising: receiving a series of sets of satellite navigation data; and iteratively repeating the method of the first aspect, for each received set of satellite navigation data.

In a third aspect, the present disclosure provides a vehicle navigation system comprising a first processing element and a second processing element: the first processing element arranged to: receive a set of satellite navigation data for the vehicle; receive a validity time of the set of satellite navigation data; and receive a series of sets of inertial navigation data each indicating acceleration and angular rate of the vehicle; the system arranged to, after the validity time, store received sets of inertial navigation data; the second processing element arranged to: use a navigation filter algorithm to process the received set of satellite navigation data together with a current position, velocity and attitude value of the vehicle, and a prediction of error states made by the navigation algorithm in a previous iteration, to generate an estimated position, velocity and attitude, and prediction of error states, of the vehicle; carry out a first catch up process comprising: obtaining a stored series of one or more sets of inertial navigation data comprising one or more sets of inertial navigation data which were received between the validity time and the completion of the processing the received set of satellite navigation data; using a set of inertial navigation data of the stored series which was the first set of inertial navigation data received after the validity time, and the estimated position, velocity and attitude of the vehicle, to calculate an updated position, velocity and attitude value of the vehicle; and for any remaining sets of inertial navigation data of the stored series, in turn, in order of reception, iteratively using each set of inertial navigation data and the updated position, velocity and attitude value of the vehicle to calculate a new updated position, velocity and attitude value of the vehicle; and send the new updated position, velocity and attitude value of the vehicle to the first processing element; and the first processing element further arranged to, after receiving the new updated position, velocity and attitude value of the vehicle from the second processing element, for subsequently received sets of inertial navigation data, in turn, in order of reception, iteratively use each received set of inertial navigation data and the new updated position, velocity and attitude value of the vehicle to calculate a new updated position, velocity and attitude value of the vehicle; wherein the new updated position, velocity and attitude value of the vehicle at the validity time is used as the current position, velocity and attitude value of the vehicle by the navigation filter algorithm.

In an embodiment, the first processing element is further arranged to, after the validity time, obtain a previously calculated updated position, velocity and attitude value of the vehicle, and for sets of inertial navigation data received after the validity time and before receiving the new updated position, velocity and attitude value of the vehicle from the second processing element, in turn, in order of reception, iteratively use each received set of inertial navigation data and the position, velocity and attitude value of the vehicle to calculate a new position, velocity and attitude value of the vehicle.

In an embodiment, the system is further arranged to continue to store received sets of inertial navigation data during the catch up process; and wherein the second processing element is further arranged to obtain a further stored series of one or more sets of inertial navigation data comprising one or more sets of inertial navigation data which were received during the catch up process, and for each set of inertial navigation data of the further stored series, in turn, in order of reception, iteratively using each set of inertial navigation data and the new updated position, velocity and attitude value of the vehicle to calculate a new updated position, velocity and attitude value of the vehicle.

In an embodiment, the set of satellite navigation data is received at the validity time of the set of satellite navigation data.

In an embodiment, the navigation filter algorithm comprises a square root filter or a Kalman filter.

In a fourth aspect, the present disclosure provides an airborne weapon comprising a navigation system, the navigation system comprising a first processing element and a second processing element: the first processing element arranged to: receive a set of satellite navigation data for the vehicle; receive a validity time of the set of satellite navigation data; and receive a series of sets of inertial navigation data each indicating acceleration and angular rate of the vehicle; the system arranged to, after the validity time, store received sets of inertial navigation data; the second processing element arranged to: use a navigation filter algorithm to process the received set of satellite navigation data together with a current position, velocity and attitude value of the vehicle, and a prediction of error states made by the navigation algorithm in a previous iteration, to generate an estimated position, velocity and attitude, and prediction of error states, of the vehicle; carry out a first catch up process comprising: obtaining a stored series of one or more sets of inertial navigation data comprising one or more sets of inertial navigation data which were received between the validity time and the completion of the processing the received set of satellite navigation data; using a set of inertial navigation data of the stored series which was the first set of inertial navigation data received after the validity time, and the estimated position, velocity and attitude of the vehicle, to calculate an updated position, velocity and attitude value of the vehicle; and for any remaining sets of inertial navigation data of the stored series, in turn, in order of reception, iteratively using each set of inertial navigation data and the updated position, velocity and attitude value of the vehicle to calculate a new updated position, velocity and attitude value of the vehicle; and send the new updated position, velocity and attitude value of the vehicle to the first processing element; and the first processing element further arranged to, after receiving the new updated position, velocity and attitude value of the vehicle from the second processing element, for subsequently received sets of inertial navigation data, in turn, in order of reception, iteratively use each received set of inertial navigation data and the new updated position, velocity and attitude value of the vehicle to calculate a new updated position, velocity and attitude value of the vehicle; wherein the new updated position, velocity and attitude value of the vehicle at the validity time is used as the current position, velocity and attitude value of the vehicle by the navigation filter algorithm.

In a fifth aspect, the present disclosure provides a computer-readable medium comprising instructions which, when executed by a computer cause the computer to carry out the method of the first aspect.

The features and embodiments discussed above may be combined as appropriate, as would be apparent to a person skilled in the art, and may be combined with any of the aspects of the invention except where it is expressly provided that such a combination is not possible or the person skilled in the art would understand that such a combination is self-evidently not possible.

BRIEF DESCRIPTION OF THE DRAWINGS

Embodiments of the present invention are described below, by way of example, with reference to the following drawings.

Figure 1:
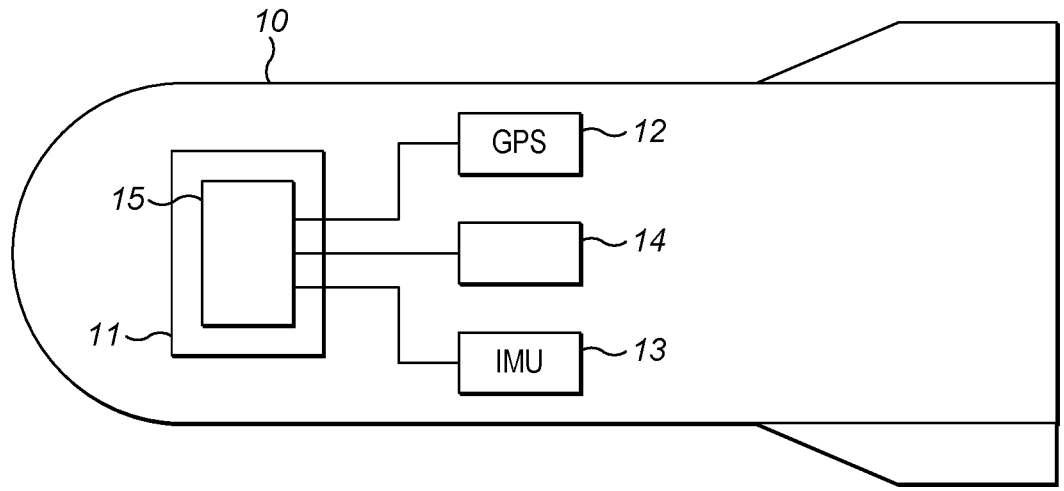
FIG. 1 shows a schematic diagram of an airborne vehicle according to an embodiment.

Common reference numerals are used throughout the figures to indicate the same or similar features.

DETAILED DESCRIPTION

Embodiments of the present invention are described below by way of example only. These examples represent the best mode of putting the invention into practice that are currently known to the Applicant although they are not the only ways in which this could be achieved. the description sets forth the functions of the example and the sequence of steps for constructing and operating the example. However, the same or equivalent functions and sequences may be accomplished by different examples.

FIG. 1 shows a schematic diagram of an airborne vehicle 10 according to a first embodiment. The airborne vehicle 10 comprises a navigation system 11 which is provided with satellite navigation data by a satellite navigation module 12 and also provided with inertial navigation data by an inertial navigation module 13. In operation, the navigation system 11 uses the satellite navigation data and the inertial navigation data to produce a continuously updated estimate of the position, velocity and attitude of the vehicle 10. The updated estimate of the position, velocity and attitude of the vehicle 10 can then be used as required. In the illustrated embodiment, each time an updated estimate of the position, velocity and attitude of the vehicle 10 is produced, the navigation system 11 provides this to a guidance system 14. The guidance system 14 compares the updated estimate of the position, velocity and attitude of the vehicle to the position and velocity of a stored target and, based on this comparison, calculates acceleration demands which will move the vehicle 10 towards the stored target. The control system 14 then converts the acceleration demands into commands to control surfaces and/or drive systems of the vehicle 10 in order to manoeuvre the vehicle 10 towards the target. The target may be moving or fixed. In other examples, the guidance system 14 may compare the updated estimate of the position, velocity and attitude of the vehicle to a desired course or track. In the illustrated embodiment the satellite navigation module 12 is a global positioning system (GPS) receiver and the inertial navigation module 13 is an inertial measurement unit (IMU). However, this is not essential, and other types of satellite navigation system and/or inertial navigation system may be used.

In other examples the guidance system 14 may compare the updated estimate of the position, velocity and attitude of the vehicle 10 to a desired destination and/or direction of travel.

In some examples the airborne vehicle 10 may be an airborne weapon. Alternatively, the airborne vehicle 10 may be a UAV or drone, a manned aircraft, or any other type of airborne vehicle. In the illustrated embodiment, the vehicle 10 is an airborne vehicle. However, this is not essential, in other examples the navigation system may be used in any type of vehicle.

In the illustrated embodiment, the satellite navigation module 12 is a GPS receiver which produces a set of satellite navigation data comprising position, velocity, and time (PVT) data describing the position and velocity of the vehicle 10 at a specified time. The satellite navigation module 12 produces the satellite navigation data at substantially periodic timings. In the illustrated example, the satellite navigation module 12 is a GPS receiver which produces valid GPS PVT data as the satellite navigation data every 128 milliseconds. In other examples the satellite navigation module 12 may produce satellite navigation data having different formats. In some examples, instead of the loosely coupled PVT format, the satellite navigation module 12 may use a tightly coupled format producing satellite navigation data comprising pseudorange and range rate values. In other examples any type of satellite navigation system, such as GNSS, may be used. Any type of satellite navigation data in any format may be used, provided that the data format is compatible with the other parts of the navigation system 11.

In the illustrated embodiment, the inertial navigation module 13 is an IMU comprising accelerometers and gyroscopes, and using the accelerometer and gyroscope data to produce a series of sets of inertial navigation data each describing the acceleration of the vehicle 10 in three orthogonal axes, based on outputs of the accelerometers, and rotation or angular rates of the vehicle 10 about three orthogonal axes, based on outputs of the gyroscopes. Conveniently, the acceleration and rotation may be described relative to the same three orthogonal axes, but this is not essential. The inertial navigation module 13 outputs the sets of inertial navigational data at a high frequency, for example 1 kHz, so that a new set of inertial navigation data is produced and output every millisecond. In other examples, a different frequency may be used, for example every 600 times per second.

Figure 2:
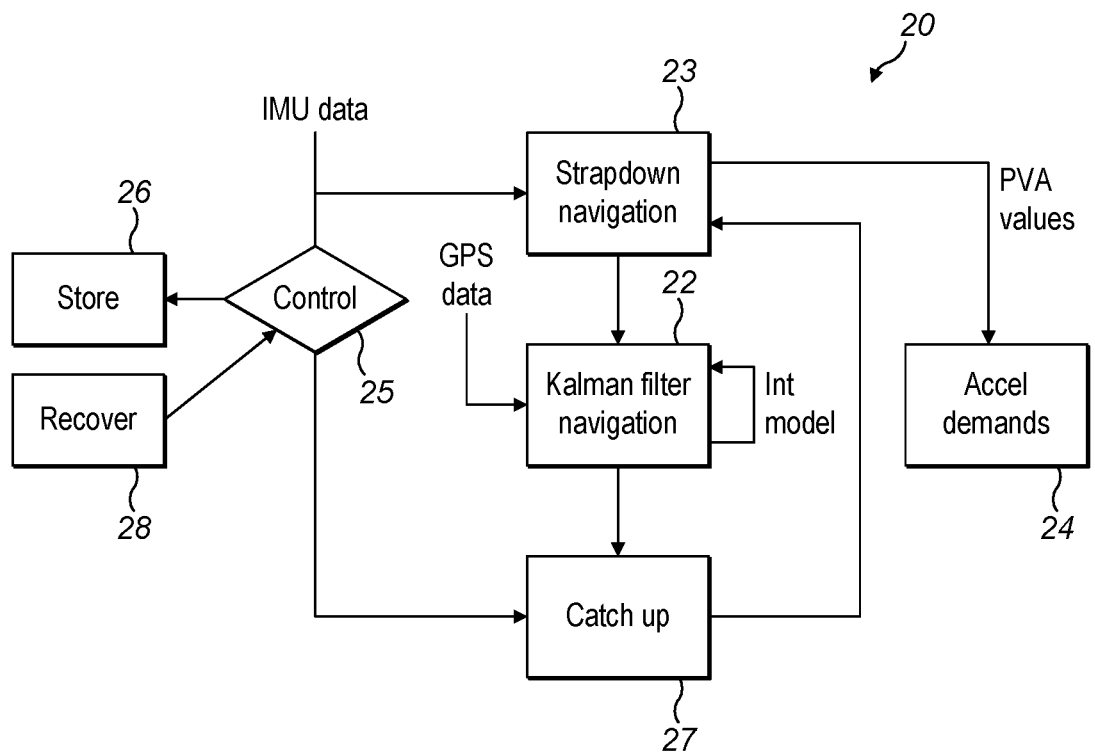
FIG. 2 shows a flow chart of a navigation method used in of operation of the airborne vehicle of FIG. 1.

FIG. 2 is a flowchart showing an overview of a method 20 used in operation of the navigation system 11. The method 20 is iterative. As is explained above, the navigation system 11 receives a series of sets of satellite navigation data from the satellite navigation module 12. An iteration of the method 20 may conveniently be regarded as starting when the navigation system 11 receives a new set of satellite navigation data comprising GPS data from the satellite navigation module 12 and a validity time of the new set of satellite navigation data. In some examples, the new set of satellite navigation data may be received at the corresponding validity time. In other examples, the validity time and the time of receipt of the corresponding new set of satellite navigation data may be different times. In a Kalman processing block 22, the navigation system 11 uses a Kalman filter navigation algorithm to process the currently measured position and velocity of the vehicle 10 according to the newly received GPS data, a current estimate of the position, velocity and attitude of the vehicle 10 generated using strapdown navigation equations (as discussed below), and internal Kalman filter error states of the Kalman filter navigation algorithm from a preceding iteration of the method 20 using a preceding set of satellite navigation data, to generate a new optimal estimate of the current position, velocity and attitude of the vehicle 10 and of the uncertainties coupled to the position, velocity and attitude of the vehicle 10, together with internal Kalman filter error states relating to the position, velocity and attitude of the vehicle 10 and their coupled uncertainties. The Kalman filter navigation algorithm is recursive, using the error states relating to the position, velocity and attitude states and their uncertainties in subsequent iterations of the Kalman filter. The error states may be regarded as an internal model or prediction of the position, velocity and attitude of the vehicle.

The new optimal estimate of the current position, velocity and attitude of the vehicle 10 and of the uncertainties coupled to the position, velocity and attitude of the vehicle 10 is output by the Kalman processing block 22, and the internal filter error states relating to the position, velocity and attitude and their coupled uncertainties is used in the next iteration of the Kalman processing block 22 when the next set of satellite navigation data is received. The generated estimate of the current position and velocity of the vehicle 10 is described as an "optimal" estimate because the Kalman filter navigation algorithm uses a least squares methodology of "blending" the error states and the current measurements to produce an optimal estimate of the values of the different states. This allows the optimal estimate to be more accurate than a single measured position and velocity value according to the GPS data, which will contain errors. Kalman filter navigation algorithms can provide high stability navigation solutions with improved accuracy and minimized drift in unstable condition. The use of Kalman filter navigation algorithms is well established in the field of navigation systems and will not be discussed in detail herein.

In the illustrated example, a Kalman filter navigation algorithm is used. Kalman filter algorithms generally have the advantage of being stable. However, the use of a Kalman filter is not essential. In other examples an alternative type of navigation algorithm may be used. Any type of time sensitive navigation algorithm may be used, such as a time sensitive filter based navigation algorithm. In some examples a square root filter navigation algorithm may be used instead of a Kalman filter navigation algorithm. The type and form of the navigation algorithm used may vary based on the particular requirements in any specific implementation. Examples of suitable filter navigation algorithms which could be used include Unscented Kalman Filter, Extended Kalman Filter, basic Ricciati Equation Kalman Filter, and Square Root Information Filter. This list is not intended to be exhaustive.

The navigation system 11 also receives a series of sets of inertial navigation data from the inertial navigation module 13. As is explained above, the frequency at which the inertial navigation module 13 produces the inertial navigational data is higher than the frequency at which the satellite navigation module 12 produces the satellite navigation data. Accordingly, the navigation system 11 will typically receive a plurality of new sets of inertial navigation data between successive sets of new satellite navigation data. In the illustrated example, the navigation system 11 will receive 128 new sets of inertial navigation data between successive sets of new satellite navigation data.

When the navigation system 11 receives a new set of inertial navigation data from the inertial navigation module 13, in a strapdown equations block 23, the navigation system 11 applies a set of strapdown navigation equations to the new set of inertial navigation data describing the acceleration of the vehicle 10 in three orthogonal axes and angular rates of the vehicle 10 about three orthogonal axes to determine changes in the position, velocity and attitude of the vehicle 10, and uses the determined changes to update the current position, velocity and attitude value of the vehicle 10 and calculate a new current position, velocity and attitude value of the vehicle 10. The effect of the strapdown navigation equations may be regarded as integrating the linear acceleration of the vehicle 10 in three orthogonal axes and the angular/rotation rates of the vehicle 10 about three orthogonal axes over the elapsed time since the preceding updating of the position, velocity and attitude value of the vehicle 10, and updating the previous position, velocity and attitude value of the vehicle 10 to take account of this integrated acceleration and angular/rotation rates. This new, updated, current position, velocity and attitude value is then used as the current position, velocity and attitude value of the vehicle 10 for the next new set of inertial navigation data which is received. Accordingly, the current position, velocity and attitude value is iteratively updated by each successive set of inertial navigation data which is received. Suitable strapdown navigation equations may be used in any specific implementation. The form of strapdown navigation equations used may vary based on the particular details of any specific implementation. Any suitable type of strapdown navigation equations may be used, for example ECEF, ECI, local navigation reference frame forms, etc.

Each time an optimal estimate of the current position, velocity and attitude of the vehicle 10 is output by the Kalman processing block 22, the iteratively updated current position, velocity and attitude value of the vehicle 10 currently being used in the strapdown equations block 23 is replaced, so that the newest optimal estimate of the current position, velocity and attitude of the vehicle 10 taking into account the most recent set of satellite navigation data is used as the basis for subsequent iterative updating of the current position, velocity and attitude value in the strapdown equations block 23.

Each time the navigation system 11 updates the position, velocity and attitude value of the vehicle 10 in the strapdown navigation block 23, or replaces the position, velocity and attitude value of the vehicle 10 with a new optimal estimate of the current position, velocity and attitude, the navigation system 11 compares the new or updated current position, velocity and attitude value to the position and velocity of a stored target and calculates acceleration demands which will move the vehicle 10 towards the stored target in a create demands block 24. The navigation system 11 then sends the calculated acceleration demands to the control system 14. As discussed above, the control system 14 can convert the acceleration demands into commands to control surfaces and/or drive systems of the vehicle 10 in order to manoeuvre the vehicle 10 towards the target. The calculation of acceleration demands and then commands to control surfaces is not essential. In some examples, alternative methods of generating commands to manoeuvre the vehicle from a current position, velocity and attitude value may be used.

A problem can arise in operation of the navigation system 11 if, after the validity time of a new set of satellite navigation data from the satellite navigation module 12, the navigation system 11 is unable to complete processing of the new set of satellite navigation data with the Kalman filter navigation algorithm to provide an optimal estimate of the current position, velocity and attitude value of the vehicle 10 before the navigation system 11 receives the next set, or next several sets, of inertial navigation data from the inertial navigation system 13, either because of a time delay between the validity time and receiving the new set of satellite navigation data, or a time taken to process the new set of satellite navigation data in the Kalman processing block, or both. When this is the case, the inertial navigation data in these "missed" set(s) of inertial navigation data is effectively lost, reducing the accuracy of the updated current position, velocity and attitude values calculated using the strapdown navigation equations from subsequent sets of inertial navigation data received by the navigation system 11 after the optimal estimate has been calculated. It will be understood that the Kalman filter navigation algorithm and the optimal estimate of the current position, velocity and attitude of the vehicle 10 produced by the Kalman filter navigation algorithm are highly time sensitive, so that if the processing of the Kalman filter navigation algorithm to provide the optimal estimate causes one or more set(s) of inertial navigation data to be missed or lost, applying strapdown navigation equations based on the optimal estimate to the next set of inertial navigation data received by the navigation system 11 will provide an unreliable, and likely inaccurate, updated estimate of the current position, velocity and attitude data of the vehicle 10, and that the successive updated estimates of the current position, velocity and attitude data of the vehicle 10 produced using subsequent sets of inertial navigation data will also be unreliable and inaccurate. Further, there is a risk that the missed sets of inertial navigation data may cause the Kalman filter navigation algorithm to become unstable, so that subsequent estimates of the current position, velocity and attitude data of the vehicle 10 produced by the Kalman filter navigation algorithm are suboptimal or even completely incorrect.

In order to address this problem, when a new set of inertial navigation data is received, it is determined in a control block 25 whether a validity time of a new set of satellite navigation data has been passed, and the corresponding optimal estimate of the current position, velocity and attitude of the vehicle 10 has not yet been processed in the Kalman filter navigation algorithm and the results used to replace the iteratively updated current position, velocity and attitude value of the vehicle 10 being used in the strapdown equations block 23. In this case, where it is determined that a validity time of a new set of satellite navigation data has been passed, but the processing of the set of satellite navigation data has not yet been completed, the new set of inertial navigation data is stored in a store block 26, in addition to being provided to the strapdown equations block 23.

Further, when a new optimal estimate of the current position, velocity and attitude of the vehicle 10 and of the uncertainties coupled to the position, velocity and attitude of the vehicle 10 is output by the Kalman processing block 22, it is determined in the control block 25 that this has occurred, and the control block 25 recovers the previously stored sets of inertial navigation data in a recover block 28. Then, in a catch up block 27, the navigation system 11 applies a set of strapdown navigation equations to each of the recovered sets of inertial navigation data which have been recovered in the recover block, after being stored in the store block 26 since the validity time of the set of satellite navigation data on which the new optimal estimate is based was received. The strapdown navigation equations are applied in the order in which the sets of inertial navigation data were received. In the catch up block 27, in a similar manner to the strapdown equations block, the set of strapdown navigation equations are applied to each set of inertial navigation data to determine changes in the position, velocity and attitude of the vehicle 10. These determined changes are then used, starting from the optimal estimate of the current position, velocity and attitude of the vehicle 10 output by the Kalman processing block 22, to iteratively update and calculate a new current position, velocity and attitude value of the vehicle 10. The effect of the strapdown navigation equations may be regarded as integrating the linear acceleration of the vehicle 10 in three orthogonal axes and the rotation of the vehicle 10 about three orthogonal axes over the elapsed time since the preceding updating of the position, velocity and attitude value of the vehicle 10, and updating the previous position, velocity and attitude value of the vehicle 10 to take account of this integrated acceleration and rotation. This new, updated, current position, velocity and attitude value is then used as the current position, velocity and attitude value of the vehicle 10 for the next stored set of inertial navigation data. Accordingly, the optimal position, velocity and attitude value is iteratively updated by each successive set of stored inertial navigation data.

When all of the stored sets of inertial navigation data have been processed in the catch up block 27, the final updated, current position, velocity and attitude value is output by the catch up block 27. This updated, current position, velocity and attitude value is used in the strapdown equations block 22 to replace the iteratively updated current position, velocity and attitude value of the vehicle 10 currently being used in the strapdown equations block 23.

In the illustrated embodiment, the same strapdown navigation equations are used in the strapdown equations block 23 and the catch up block 27. This is not essential, and in other examples different strapdown navigation equations are used in the strapdown equations block 23 and the catch up block 27.

In the present disclosure, the updating of the optimal position, velocity and attitude value output by the Kalman navigation algorithm to take into account the sets of inertial navigation data received since the validity time of the satellite navigation data, including while the satellite navigation data is being processed by the Kalman navigation algorithm, before the output position, velocity and attitude value is used ensures that all of the navigation data contained in the sets of inertial navigation data is taken into account, and no sets of inertial navigation data are missed or lost. Accordingly, the accuracy of the updated current position, velocity and attitude values calculated using the strapdown navigation equations may be improved in examples where the navigation system 11 is unable to complete processing of a new set of satellite navigation data with the Kalman filter navigation algorithm before the navigation system 11 receives the next set(s) of inertial navigation data from the inertial navigation system 13. Accordingly, the navigation system 11 may provide more reliable and/or accurate, estimates of the current position, velocity and attitude of the vehicle 10. Further, the risk of the Kalman filter navigation algorithm becoming unstable may be reduced or avoided. Accordingly, the requirement to use a complex computing system such as a high specification multi-core processor and/or a complex operating system (OS) with a multi-threading capability, which may be costly, and may be difficult and costly to qualify against safety critical reliability standards, in order to process the Kalman filter navigation algorithm sufficiently quickly may be overcome. Further, by enabling the satellite navigation data to be processed in the Kalman filter navigation algorithm together with the position, velocity and attitude values calculated using the strapdown navigation equations at the validity time of the satellite navigation data, the present disclosure may enable the satellite navigation data to be synchronised with the inertial navigation system data. Such time synchronisation of the different types of data is important because if the different data used is not related to the same time the movements of the vehicle 10 between the different times the different data relates to can introduce a lot of unknown errors in all navigation states, such as position, velocity and attitude in the illustrated embodiments, and also into the internal filter error states used in the Kalman filter calculations.

In the illustrated embodiment, acceleration demands and corresponding commands are calculated each time a new updated estimate of the position, velocity and attitude of the vehicle 10 is produced in the strapdown navigation block 23 and output by the navigation system 11. In other examples, commands may be calculated as required to control the movement of the vehicle 10 in a desired manner. In some examples, commands may be calculated periodically, or in response to events, based on the current updated estimate of the position, velocity and attitude of the vehicle 10 with a timing independent of the timings of the updates.

In the illustrated embodiment, the navigation system 11 generates estimates of the position, velocity and attitude values of the vehicle 10 and outputs these to a guidance system 14 to calculate acceleration demands. In other examples, the navigation system may alternatively, or additionally, provide the position, velocity and attitude values of the vehicle 10 as an output for use by other systems. In some examples the position, velocity and attitude values of the vehicle 10 output by the navigation system 11 may be provided to a guidance system and/or control system for use to generate commands to control surfaces and/or drive systems. The navigation system may output any or all of the position, velocity and attitude values, as required in any specific implementation.

Figure 3:
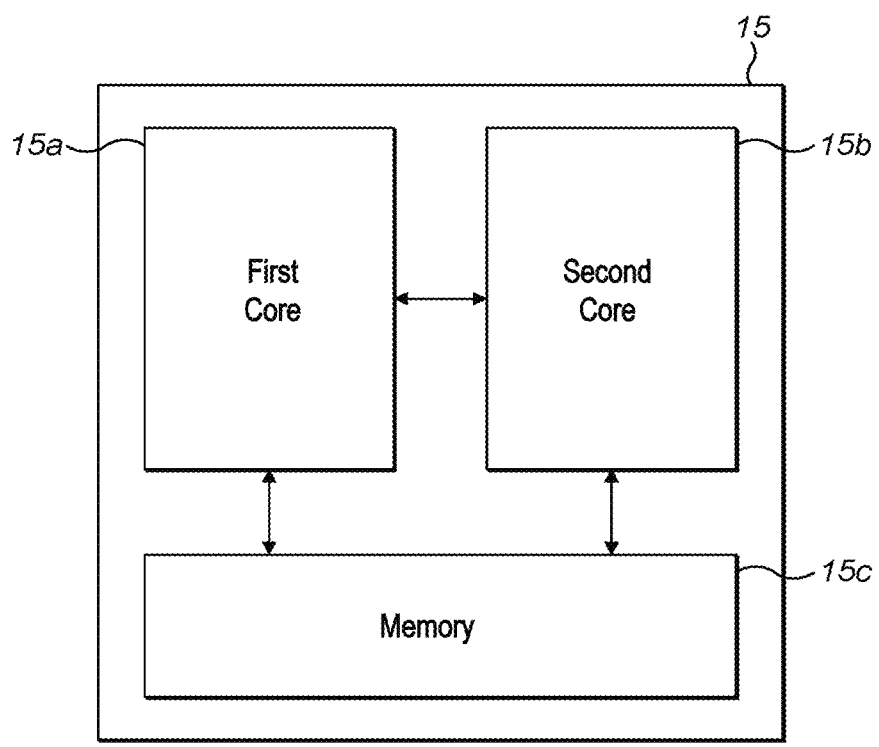
FIG. 3 is a schematic diagram of a navigation processor of the airborne vehicle of FIG. 1.

FIG. 3 is a schematic diagram showing details of a processor 15 used in the navigation system 11. The processor 15 is a dual core processor comprising a first core 15*a* and a second core 15*b*, and an on-chip shared memory 15*c*. The first core 15*a* and the second core 15*b* are not synchronous. In the illustrated embodiment the second core 15*b* runs faster than the first core 15*a* to minimise processing delays. In some examples the first core 15*a* may run at a frequency of 600 Hz, while the second core runs at a frequency of 6 KHz. However, the use of asynchronous cores and these specific frequencies are not essential.

The processor 15 is a system on chip "SoC" device. The shared memory 15*c* of the processor 15 is accessible to both of the first and second cores 15*a* and 15*b*. In the illustrated embodiment the processor 15 of the navigation system 11 is a bare metal computer system, that is, a computer system without any base operating system or installed applications. This may provide the advantages that the processor 15 may be relatively cheap, and that the processor 15 can be qualified against relevant reliability standards relatively easily and cheaply. It is generally required to qualify the computer systems and processors against relevant reliability standards in safety critical applications, for example, in military applications where the vehicle 10 is a weapon. However, it is not essential that the processor 15 is a bare metal computer system.

It is not essential that the processing is carried out by different cores of a dual core processor. The first core 15*a* and second core 15*b* of the illustrated embodiments may be replaced by any separate first and second processing elements. For example, the first core 15*a* and second core 15*b* could be different cores of a processor having more than two cores, or could be two separate processors.

In the illustrated embodiment, the navigation system 11, and in particular the processor 15 of the navigation system 11, maintains an updated position, velocity and attitude of the vehicle 10, and also generates commands to manoeuvre the vehicle 10 based on the updated position, velocity and attitude of the vehicle 10. In other examples the processor 15 may just maintain an updated position, velocity and attitude of the vehicle 10 while other parts of the navigation system 11 generate commands to manoeuvre the vehicle 10 based on the updated position, velocity and attitude. In alternative other examples, the navigation system 11 may just maintain an updated position, velocity and attitude of the vehicle 10 while other components of the vehicle 10 generate commands to manoeuvre the vehicle 10 based on the updated position, velocity and attitude.

Figure 4:
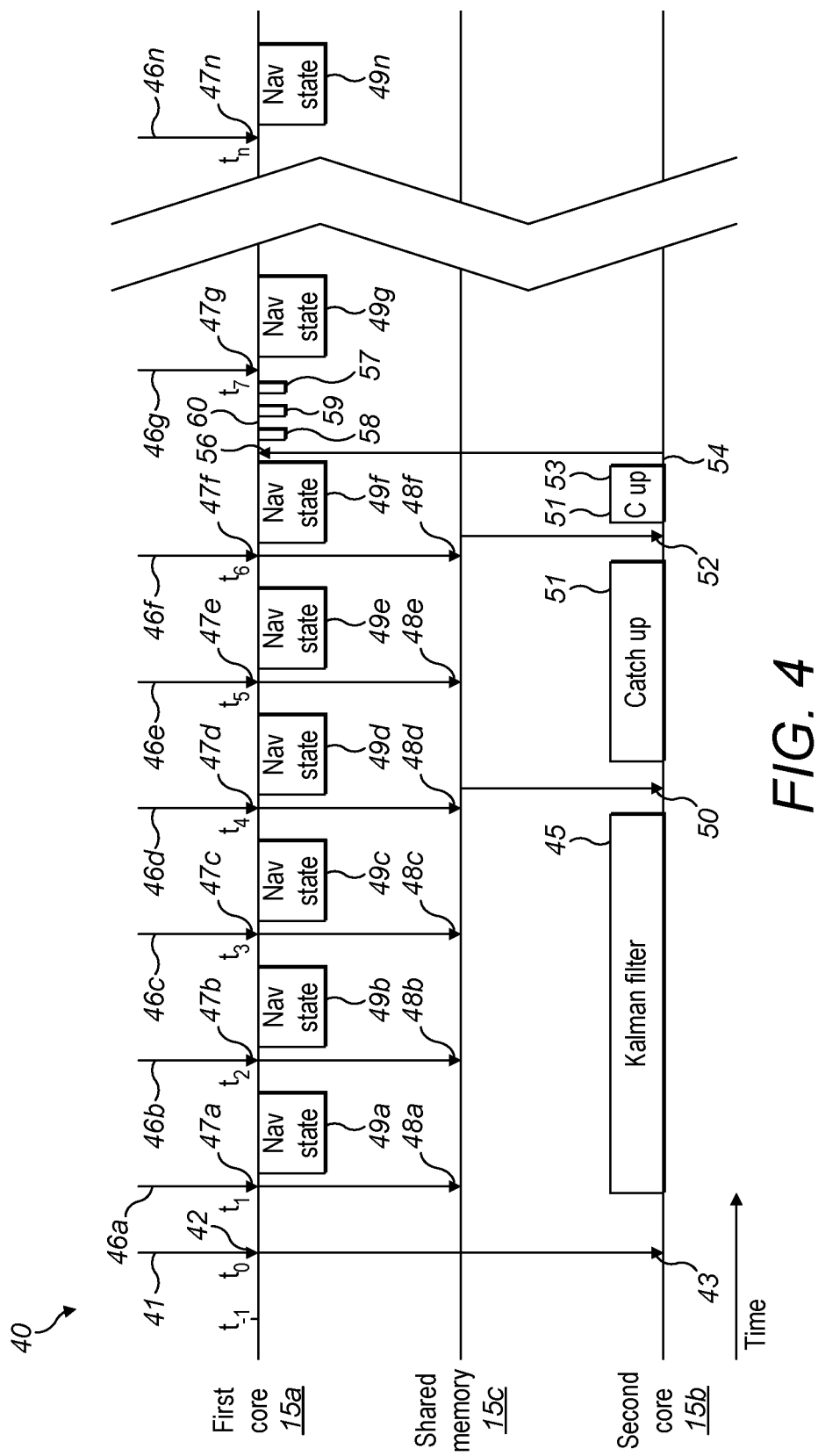
FIG. 4 is an explanatory diagram of operations carried out by the navigation processor in the embodiment of FIG. 1.

FIG. 4 is a diagram showing a timeline 40 of actions carried out by the components of the processor 15 in operation of the navigation system 11. FIG. 4 shows in more detail the actions carried out by the processor 15 of the navigation system 11 in the method 20 of FIG. 2. FIG. 4 illustrates a situation where the navigation system 11 is already operating to generate a series of updated sets of position, velocity and attitude values for the vehicle 10. In the illustrated embodiment the first core 15a of the processor controls all of the actions carried out by both the first core 15a and the second core 15b of the processor 15, to ensure proper timing and synchronisation. Accordingly, the first core 15a sends instructions to the second core 15b. However, this is not essential, and other means to synchronise the operation of the first core 15a and second core 15b may be used.

As shown in FIG. 4, at a time to, the processor 15 receives 42 a new set of satellite navigation data 41 comprising GPS PVT data from the satellite navigation module 12. The receiving 42 of this new set of satellite navigation data 41 corresponds to the start of the Kalman processing block 22 of the method 20 of FIG. 2. In the illustrated embodiment of FIG. 4, the validity time of the new set of satellite navigation data 41 is the same as the time at which it is received. Accordingly, the receipt of the new set of satellite navigation data 41 can be used as the validity time without any separate communication of the validity time being required. The new set of satellite navigation data 41 is received 42 by the first core 15a of the processor 15. When the first core 15a receives 42 the new set of satellite navigation data 41 at time to, the first core 15a forwards this new set of satellite navigation data 41, and a current position, velocity and attitude value for the vehicle 10 held by the first core 15a, to the second core 15b. The first core 15a also instructs the second core 15b to update the Kalman filter navigation algorithm using the new set of satellite navigation data 41. Although, as is explained above, the second core 15b of the processor 15 operates following instructions from the first core 15a of the processor 15, these instructions are not shown in FIG. 4, for clarity. As is explained above, FIG. 4 illustrates a situation where the navigation system 11 is already operating. Accordingly, the first core 15a has available a previously calculated current position, velocity and attitude value for the vehicle 10 based on previously received sets of inertial navigation data and the output of the Kalman filter navigation algorithm in a previous iteration of the method 20, based on the preceding received set of satellite navigation data.

When the second core 15b receives 43 the new set of satellite navigation data 41 and the current position, velocity and attitude value forwarded from the first core 15a, and the instructions to proceed, the second core 15b uses the Kalman filter navigation algorithm to process 45 the current (that is, most recently received) measured position and velocity of the vehicle 10 according to the new set 41 of satellite navigation data received at time to, the current position, velocity and attitude value, and internal filter error states of the position, velocity and uncertainty in position and velocity of the vehicle 10 produced in the preceding iteration of the Kalman filter navigation algorithm, to calculate an optimal set of Kalman filter states and uncertainties in those states, which provide an estimate of the current position, velocity and attitude of the vehicle 10 and the uncertainty in the position, velocity and attitude of the vehicle 10. As is explained above, FIG. 4 illustrates a situation where the navigation system 11 is already operating. Accordingly, processor 15 has previously calculated a predicted position, velocity and attitude, and uncertainty in position, velocity and attitude of the vehicle 10 using the Kalman filter navigation algorithm in a previous iteration of the method 20, based on the preceding received set of satellite navigation data. In the illustrated embodiment the Kalman filter states used comprise position, velocity and attitude, but many other states may be used in other examples.

In the illustrated example, the processing and calculation 45 using the Kalman filter navigation algorithm by the second core 15b requires more time than the 1 millisecond between the generating of successive new sets of inertial navigation data by the inertial navigation module 12. Accordingly, when a next new set of inertial navigation data from the inertial navigation module 12 is received by the processor 15 at a time $t_1$, the second core 15b is still processing 45 using the Kalman filter navigation algorithm.

The first core 15a receives 47a the next new set 46a of inertial navigation data at time $t_1$, and the first core 15a stores 48a this new set 46a of inertial navigation data in the shared memory 15c. The time $t_1$ is 1 millisecond after the time $t_{-1}$. Further, the first core 15a uses the new set 46a of inertial navigation data, together with strapdown navigation equations and a current position, velocity and attitude value of the vehicle 10 calculated based on previously received sets 46 of inertial navigation data to calculate 49a an updated new current position, velocity and attitude value of the vehicle 10, which is used to replace the previous current position, velocity and attitude value of the vehicle 10. As is explained above, FIG. 4 illustrates a situation where the navigation system 11 is already operating. Accordingly, the first core 15a has available a previously calculated current position, velocity and attitude value for the vehicle 10 based on a preceding set of inertial navigation data received up to a previous time $t_{-1}$, a set of strapdown navigation equations, and the output of the Kalman filter navigation algorithm in a previous iteration of the method 20, based on the preceding received set of satellite navigation data.

Further new sets 46b, 46c, 46d of inertial navigation data from the inertial navigation module 12 are successively received by the processor 15 at respective times $t_2$, $t_3$, $t_4$ at 1 millisecond intervals, while the second core 15b is still processing 45 using the Kalman filter navigation algorithm. The first core 15a receives 47b, 47c, 47d each of the next new sets 46b, 46c, 46d of inertial navigation data at respective times $t_2$, $t_3$, $t_4$, and the first core 15a stores 48b, 48c, 48d these new sets 46b, 46c, 46d of inertial navigation data in the shared memory 15c similarly to the set 46a of inertial navigation data as described above. The first core 15a uses each successive new set 46b, 46c, 46d of inertial navigation data, together with the strapdown navigation equations and the current position and velocity value of the vehicle 10 which was calculated using the previous set 46 of inertial navigation data, to respectively calculate 49b, 49c and 49d an updated new current position and velocity value of the vehicle 10, which is used to replace the previous current position and velocity value of the vehicle 10 based on the previously received set 46 of inertial navigation data.

In the illustrated example, the processing and calculation 45 using the Kalman filter navigation algorithm by the second core 15b is completed at, or after, time $t_4$, when the fourth new set 46d of inertial navigation data from the inertial navigation module 12 following the receipt 42 of the new set of satellite navigation data 41 is received by the processor 15, but before the next successive set of satellite navigation data 41 is received. This timing is not essential, and is by way of example only. It will be understood that the time taken to carry out the processing and calculating of the Kalman filter navigation algorithm relative to the time between reception of successive sets of inertial navigation data will vary depending on the details of each specific implementation, so that any number of one or more sets of inertial navigation data may be received during the processing and calculating of the Kalman filter navigation algorithm.

When the processing and calculation 45 using the Kalman filter navigation algorithm by the second core 15*b* is completed, so that the second core 15*b* has calculated an optimal estimate of the current position and velocity of the vehicle 10, the second core 15*b* obtains 50 from the shared memory 15*c* the stored sets 46*a* to 46*d* of inertial navigation data. The second core 15*b* then carries out a catch up process 51. This may be regarded as a first stage of the catch up process 51, but as is explained below, there are not necessarily any further stages.

In the catch up process 51, the second core 15*b* uses the set of 46*a* of inertial navigation data together with the set of strapdown navigation equations and the newly calculated optimal estimate of the current position, velocity and attitude of the vehicle 10 calculated using the Kalman filter navigation algorithm to calculate an updated new current position, velocity and attitude value of the vehicle 10. Then, the second core 15*b* iteratively repeats this process for each of the sets 46*b* to 46*d* of inertial navigation data, using the set of strapdown navigation equations and each successive set 46*b* to 46*d* of inertial navigation data to calculate a respective successive updated new current position, velocity and attitude value of the vehicle 10 from the current position, velocity and attitude value of the vehicle 10 calculated using the previous set 46 of inertial navigation data, until all of the stored sets 46*a* to 46*d* of inertial navigation data have been processed.

The catch up process 51 ensures that the current position, velocity and attitude value of the vehicle 10 calculated by the second core 15*b* takes into account any sets 46 of inertial navigation data which are received during processing 45 of the Kalman filter navigation algorithm, so that the inertial navigation data in these "missed" set(s) of inertial navigation data is not lost.

In practice, the second core 15*b* may take longer to carry out the catch up process 51 than the time between completing the processing and calculation 45 using the Kalman filter navigation algorithm and the receiving 47 of one or more further new sets 46 of inertial navigation data from the inertial navigation module 12 by the first core 15*a* following the receiving 47*d* of the final set 46*d* of inertial navigation data received during the processing and calculation 45 using the Kalman filter navigation algorithm. It will be understood that the time taken to carry out the processing and calculating of the Kalman filter navigation algorithm relative to the time between reception of successive sets of inertial navigation data will vary depending on the details of each specific implementation, so that any number of none, or one, or more, sets of inertial navigation data may be received during the catch up process 51.

In the illustrated example, when the next two successive new sets 47*e* and 47*f* of inertial navigation data from the inertial navigation module 12 are received by the processor 15 at respective times $t_5$ and $t_6$, the second core 15*b* is carrying out the catch up process 51, so that the current position, velocity and attitude value of the vehicle 10 calculated by the second core 15*b* based on the set 41 of satellite navigation data, and taking into account the sets 46*a* to 46*d* of inertial navigation data, is not yet available to the first core 15*a*. Accordingly, when the first core 15*a* receives 47*e*, 47*f* each of the new sets 46*e*, 46*f* of inertial navigation data at respective times $t_5$, $t_6$, the first core 15*a* stores 48*e*, 48*f* each of these new sets 46*e*, 46*f* of inertial navigation data in the shared memory 15*c* similarly to the sets 46*a* to 46*d* of inertial navigation data as described above. The first core 15*a* uses each successive new set 46*e*, 46*f* of inertial navigation data, together with the strapdown navigation equations and the current position, velocity and attitude value of the vehicle 10 which was calculated using the previous set 46 of inertial navigation data, and held by the first core 15*a*, to respectively calculate 49*e* and 49*f* an updated new current position, velocity and attitude value of the vehicle 10, which is used to replace the previous current position, velocity and attitude value of the vehicle 10 based on the previously received set 46 of inertial navigation data.

When the catch up process 51 by the second core 15*b* has completed processing the stored sets 46*a* to 46*d* of inertial navigation data received during the processing and calculating of the Kalman filter navigation algorithm, the second core 15*b* obtains 52 from the shared memory 15*c* the stored sets 46*e* and 46*f* of inertial navigation data. The second core 15*b* then continues the catch up process 51 into a second stage 53.

In the second stage 53 of the catch up process 51, the second core 15*b* iteratively uses the set of strapdown navigation equations and each successive set 46*e* and 46*f* of inertial navigation data to calculate a successive updated new current position, velocity and attitude value of the vehicle 10 from the current position, velocity and attitude value of the vehicle 10 calculated using the previous set 46 of inertial navigation data, until all of the stored sets 46*e* and 46*f* of inertial navigation data have been processed.

The second stage 53 of the catch up process 51 ensures that the current position, velocity and attitude value of the vehicle 10 calculated by the second core 15*b* takes into account any sets 46 of inertial navigation data which are received during the first catch up process 51, so that the inertial navigation data in these "missed" set(s) of inertial navigation data is not lost.

When the second core 15*b* has completed the second stage 53 of the catch up process 51, the second core 15*b* sends the current position, velocity and attitude value 54 of the vehicle 10, which is based on the set 41 of satellite navigation data and has been updated to take into account all of the sets 46*a* to 46*f* of inertial navigation data received by the processor 15 since the set 41 of satellite navigation data was received, to the first core 15*a*.

The output of the current position, velocity and attitude value 54 of the vehicle 10 from the second core 15*b* corresponds to the output of the catch up block 27 of the method 20 of FIG. 2. As is explained above, the current position, velocity and attitude value 54 of the vehicle 10 has been updated to take into account all inertial navigation data received during processing of the Kalman filter navigation algorithm. This may improve the accuracy and reliability of the current position and velocity value 54. Further, if the inertial navigation data received during processing of the Kalman filter navigation algorithm was not taken into account, the movement of the vehicle 10 during processing of the Kalman filter navigation algorithm could introduce errors into the Kalman filter, reducing accuracy, and possibly making the Kalman filter navigation algorithm unstable. Accordingly, the present disclosure may improve accuracy and stability of the navigation system.

When the first core 15*a* receives 56 the current position, velocity and attitude value 54 of the vehicle 10 from the second core 15*b*, the first core 15*a* carries out a check 58 whether there are any sets 46 of inertial navigation data stored in the shared memory 15*c* which have not been used by the second core 15*b* in the first and second catch up processes 51 and 53. If the check 58 identifies that there is an unused set 46 of inertial navigation data stored in the shared memory 15*c*, the first core 15*a* uses this unused set 46 of inertial navigation data, together with the strapdown navigation equations and the current position, velocity and attitude value 54 of the vehicle 10 received 56 from the second core 15*b*, to calculate 59 an updated new current position, velocity and attitude value 60 of the vehicle 10.

Following the check 58, and if carried out, the calculation 59, the first core 15*a* then uses the received current position, velocity and attitude value 54 of the vehicle 10, or if it exists, the updated new current position, velocity and attitude value 60 of the vehicle 10, to replace 57 the current position, velocity and attitude value which has been iteratively calculated by the first core 15*a* using the sets 46*a* to 46*f* of inertial navigation data received by the first core 15*a* while the second core 15*b* has been carrying out the processing and calculation 45 using the Kalman filter navigation algorithm and the catch up process 51. It will be understood that because the received current position, velocity and attitude value 54 is based upon a more recent set 41 of satellite navigation data, and a more recent iteration of the Kalman filter navigation algorithm, the received current position, velocity and attitude value 54, and if it exists, the updated new current position, velocity and attitude value 60 are more accurate and more reliable than the current position, velocity and attitude value held by the first core 15*a*. Further, the current position, velocity and attitude value held by the first core 15*a* is less accurate than the values 54 and 60 because it has been calculated by integrating a large number of inherently noisy inertial measurements from the IMU of the inertial navigation module 13, and this integration of noisy measurements results in an increase in inaccuracy over time. The receiving 56 of the current position, velocity and attitude value 54 of the vehicle 10 by the first core 15*a* corresponds to the updating in the strapdown navigation block 23 of the method 20 of FIG. 2.

The check 58 ensures that in the event that a new set 46 of inertial navigation data is received during the period of time between the completion of the second part 53 of the update process 51 by the second core 15*b* and the receiving 55 of the current position and velocity value 54 by the first core, this set of inertial navigation data will not be lost, but will be taken into account in the calculated position, velocity and attitude of the vehicle 10. Accordingly, by this optional process the reliability and accuracy of the successive updated estimates of the current position, velocity and attitude of the vehicle 10 produced by the navigation system 11 may be improved. As a result, the effectiveness of the control commands in directing the vehicle 10 may be improved.

Subsequently, when further sets 46*g* to 46*n* of inertial navigation data are received 47*g* to 47*n* by the first core 15*a*, at respective times $t_7$ to $t_n$, the first core 15*a* iteratively updates the current position, velocity and attitude value of the vehicle 10 by using each successive new set 46*g* to 46*n* of inertial navigation data, together with the strapdown navigation equations, to iteratively respectively calculate 49*g* to 49*n* an updated new current position, velocity and attitude value, with the iterative updating based on the received current position, velocity and attitude value 54 of the vehicle 10. This iterative updating continues until a new set of satellite navigation data is received by the processor 15, and the timeline 40 is then repeated for the new set of satellite navigation data. This iterative updating corresponds to the strapdown navigation block 23 of the method 20 of FIG. 2.

It will be understood from the preceding description that, the method as a whole including both the first part of the catch up process 51 and (if required) the second part 53 of the catch up process 51 ensures that the current position, velocity and attitude value of the vehicle 10 calculated by the second core 15*b* takes into account any sets 46 of inertial navigation data which are received during the processing and calculation 45 of the Kalman filter navigation algorithm and also of the catch up process 51, so that the inertial navigation data in these possible "missed" set(s) of inertial navigation data is not lost. Accordingly, the reliability and accuracy of the successive updated estimates of the current position, velocity and attitude data of the vehicle 10 produced by the navigation system 11 may be improved.

During the illustrated method according to the timeline of FIG. 4, the first core 15*a* of the processor 15 produces a sequence of updated new current position, velocity and attitude values of the vehicle 10, as outputs of the calculations 49. The first core 15*a* compares each of these updated new current position, velocity and attitude values of the vehicle 10 to a stored position and velocity of a target, and, based on the results of the comparison, calculates acceleration demands required to move the vehicle 10 towards the stored target, and outputs these to the control system 14. In other examples, acceleration demands may be calculated as required to control the movement of the vehicle 10 in a desired manner. In some examples, acceleration demands may be calculated periodically at a period different from the timings of the position and velocity value updates.

As is explained above, the first core 15*a* continues to produce estimates of the current position, velocity and attitude value based on the received sets of inertial navigation data while the second core is carrying out the processing and calculation 45 of the Kalman filter navigation algorithm and the catch up process 51. Accordingly, there is no period when the sequence of successive updated estimates of the current position, velocity and attitude values of the vehicle 10 is not being produced by the navigation system 11. Accordingly, the reliability and accuracy of the successive updated estimates of the current position, velocity and attitude of the vehicle 10 produced by the navigation system 11 may be improved. As a result, the effectiveness of the control commands in directing the vehicle 10 to follow a desired track to a target may be improved.

In an alternative arrangement, the sequence of calculate 59 and replace 57 may be reversed, so that the first core 15*a* always uses the current position, velocity and attitude value 54 of the vehicle 10 received from the second core 15*b* to replace 57 the current position, velocity and attitude value which has been iteratively calculated by the first core 15*a*, and if the check 58 does identify an unused set 46 of inertial navigation data, the first core 15*a* uses the replacement current position, velocity and attitude value 54 and the unused set 46 of inertial navigation data stored in the shared memory 15*c*, together with the strapdown navigation equations, to calculate an updated current position, velocity and attitude value for the vehicle 10. This updated current position, velocity and attitude value is then used as the basis for subsequent iterative updating of the current position, velocity and attitude value of the vehicle 10 when each successive new set 46 of inertial navigation data is received.

In the illustrated embodiment of FIG. 4, a second part 53 of the catch up process 51 is carried out by the second core 15*b*. In some other embodiments the second part 53 of the catch up process 51 may not be required, and may be omitted.

Figure 5:
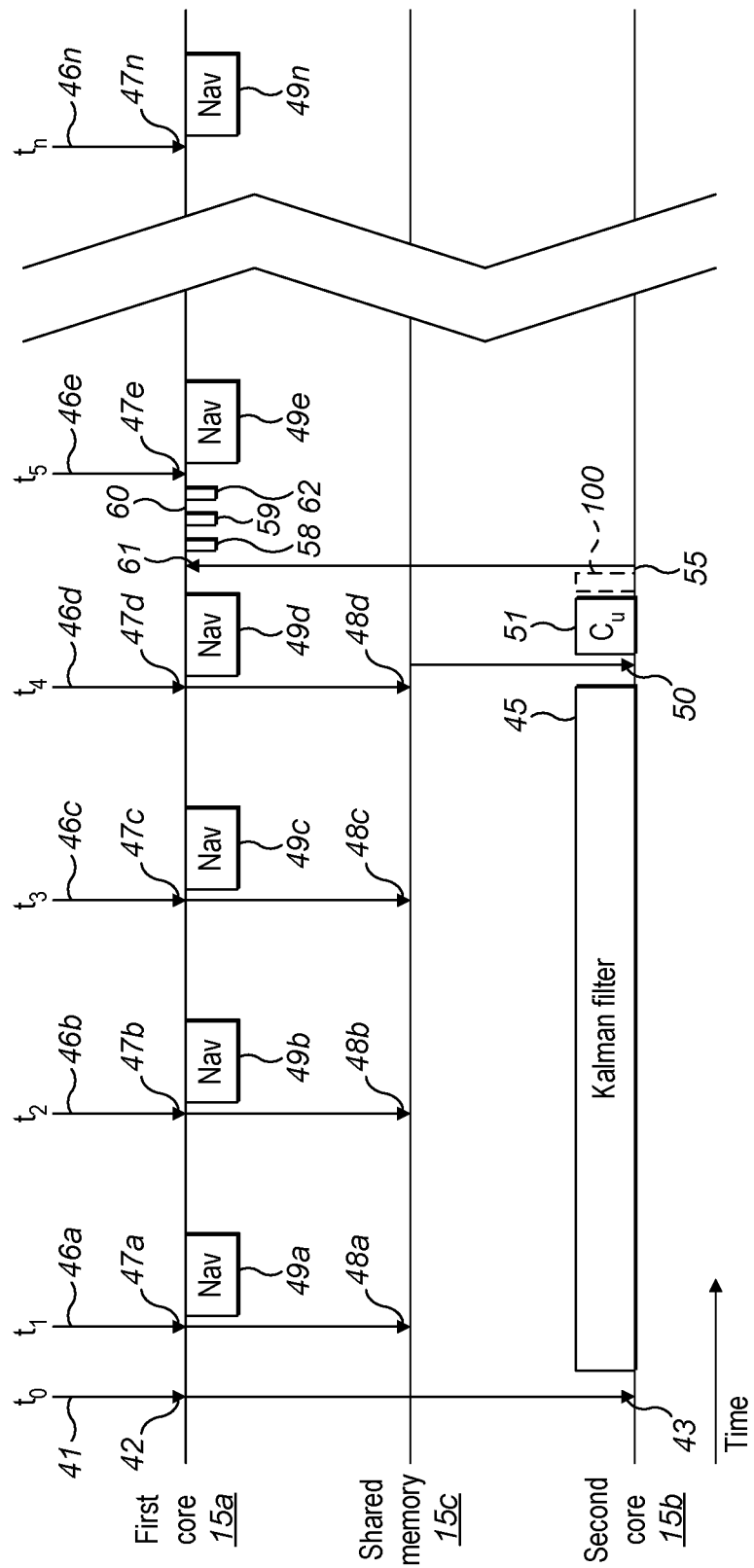
FIG. 5 is an explanatory diagram of operations carried out by the navigation processor in an alternative embodiment.

FIG. 5 is a diagram showing a timeline of actions carried out by the components of the processor 15 in operation of the navigation system 11. FIG. 5 shows the actions carried out by the processor 15 of the navigation system 11 in an alternative embodiment where the second part 53 of the catch up process 51 is not required or carried out.

FIG. 5 illustrates an embodiment in which the time taken by the second core 15*b* to carry out the catch up process 51 is shorter than the time between the receptions 47 of successive sets 46 of inertial navigation data. As a result, as can be seen in FIG. 5, in this embodiment, no new sets 46 of inertial navigation data are received by the processor 15 while the second core 15*b* is carrying out the catch up process 51. Accordingly, when the catch up process 51 is completed there will not be any sets 46 of inertial navigation data which were received while the second core 15*b* was carrying out the catch up process 51 stored in the shared memory 15*c*.

In the embodiment of FIG. 5, when the second core 15*b* has completed the catch up process 51, the second core 15*b* sends the current position, velocity and attitude value 55 of the vehicle 10, which is based on the set 41 of satellite navigation data and has been updated to take into account all of the sets 46*a* to 46*d* of inertial navigation data received by the processor 15 since the set 41 of satellite navigation data was received, to the first core 15*a*. The output of the current position, velocity and attitude value 55 of the vehicle 10 from the second core 15*b* corresponds to the output of the catch up block 27 of the method 20 of FIG. 2. As is explained above, the current position, velocity and attitude value 55 of the vehicle 10 has been updated to take into account all inertial navigation data received during processing of the Kalman filter navigation algorithm, which may improve the accuracy and reliability of the current position, velocity and attitude value.

When the first core 15*a* receives 61 the current position, velocity and attitude value 55 of the vehicle 10 from the second core 15*b*, the first core 15*a* carries out a check 58 whether there are any sets 46 of inertial navigation data stored in the shared memory 15*c* which have not been used by the second core 15*b* in the catch up process 51. If the check 58 identifies that there is an unused set 46 of inertial navigation data stored in the shared memory 15*c*, the first core 15*a* uses this unused set 46 of inertial navigation data, together with the strapdown navigation equations and the current position, velocity and attitude value 54 of the vehicle 10 received 56 from the second core 15*b*, to calculate 59 an updated new current position, velocity and attitude value 60 of the vehicle 10.

Following the check 58, and if carried out, the calculation 59, the first core 15*a* then uses the received current position, velocity and attitude value 55 of the vehicle 10, or if it exists, the updated new current position, velocity and attitude value 60 of the vehicle 10, to replace 62 the current position, velocity and attitude value which has been iteratively calculated by the first core 15*a* using the sets 47*a* to 47*d* of inertial navigation data received by the first core 15*a* while the second core 15*b* has been carrying out the processing and calculation 45 using the Kalman filter navigation. It will be understood that because the received current position, velocity and attitude value 55 and, if it exists, the updated new current position, velocity and attitude value 60 are based upon a more recent set 41 of satellite navigation data, and a more recent iteration of the Kalman filter navigation algorithm, these are more accurate and more reliable than the current position, velocity and attitude value held by the first core 15*a*. Further, the current position, velocity and attitude value held by the first core 15*a* is less accurate than the values 55 and 60 because it has been calculated by a integrating a large number of inherently noisy inertial measurements from the IMU of the inertial navigation module 13, and this integration of noisy measurements results in an increase in inaccuracy over time. The receiving 61 of the current position, velocity and attitude value 55 of the vehicle 10 by the first core 15*a* corresponds to the updating in the strapdown navigation block 23 of the method 20 of FIG. 2.

The check 58 ensures that in the event that a new set 46 of inertial navigation data is received during the period of time between the completion of the update process 51 by the second core 15*b* and the receiving 61 of the current position and velocity value 55 by the first core, this set of inertial navigation data will not be lost, but will be taken into account in the calculated position, velocity and attitude of the vehicle 10. Accordingly, by this optional process the reliability and accuracy of the successive updated estimates of the current position, velocity and attitude of the vehicle 10 produced by the navigation system 11 may be improved. As a result, the effectiveness of the control commands in directing the vehicle 10 may be improved.

Subsequently, when further sets 46 of inertial navigation data are received 47 by the first core 15*a*, the first core 15*a* iteratively updates the current position, velocity and attitude value of the vehicle 10 by using each successive new set 46 of inertial navigation data, together with the strapdown navigation equations, to iteratively respectively calculate 49 an updated new current position, velocity and attitude value, with the iterative updating based on the received current position, velocity and attitude value 55 of the vehicle 10. This iterative updating continues until a new set of satellite navigation data is received by the processor 15, and the timeline 50 is then repeated for the new set of satellite navigation data. This iterative updating corresponds to the strapdown navigation block 23 of the method 20 of FIG. 2.

It will be understood from the above that the embodiment of FIG. 5 substantially corresponds to the embodiment of FIG. 4, but with the second part 53 of the catch up process 51 omitted as unnecessary, and with the updated new current position and velocity value 55 of the vehicle 10 produced at the end of the catch up process 51, instead of the updated new current position and velocity value 54 of the vehicle 10 produced at the end of the second part 53 of the catch up process 51, being used as the output of the second core 15*b* sent to the first core 15*a*.

Similarly to the embodiment of FIG. 4, optionally, when the first core 15*a* receives 61 the current position, velocity and attitude value 55 of the vehicle 10 from the second core 15*b*, the first core 15*a* may carry out a check 58 and subsequent calculation 59, in case a new set of inertial navigation data is received during the period of time between the completion of the update process 51 by the second core 15*b* and the receiving 61 of the current position, velocity and attitude value 55 by the first core 15*a*.

In the illustrated embodiment of FIG. 4, a second part 53 of the catch up process 51 is carried out by the second core 15*b*. In some other examples, it is possible that one or more new sets of inertial navigation data may be received while the second core 15*b* is carrying out the second part of the catch up process 51. In such embodiments, a third part of the catch up process 51 may be carried out after the second part 53 of the catch up process 51, to ensure that the current position, velocity and attitude value of the vehicle 10 calculated by the second core 15b takes into account any sets 46 of inertial navigation data which are received during the catch up process 51, so that the inertial navigation data in these "missed" set(s) of inertial navigation data is not lost. This additional third part of the catch up process 51 is substantially the same as the second part 53 of the catch up process 51 described above. It will be understood that in further examples, any required number of additional parts of the catch up process 51 may be sequentially carried out by the second core 15b until the processing of the catch up process 51 is completed without any new sets of inertial navigation data which were received while the second core 15b was carrying out the catch up process 51 remaining unprocessed.

In an alternative embodiment, shown in dashed lines in FIG. 5, when the second core 15b completes the catch up process 51, the first core 15a carries out a check 100 to determine whether there are any sets 46 of inertial navigation data stored in the shared memory 15c which have not been used in the catch up process 51 (as is explained above, these are sets 46 of inertial navigation data which have been received by the processor 15 while the second core 15b is carrying out the catch up process 51). If this check 100 determines that there are no unused sets 46 of inertial navigation data stored in the shared memory 15c, the second core 15b outputs the updated current position, velocity and attitude of the vehicle 10 produced at the end of the catch up process 51 to the first core 15a, as the current position, velocity and attitude of the vehicle 10. Alternatively, if this check 100 determines that there are one or more unused sets 46 of inertial navigation data stored in the shared memory 15c, the first core 15a instructs the second core 15b to repeat the catch up process 51 for a further stage to update the current position, velocity and attitude of the vehicle 10 using these unused sets 46 of inertial navigation data (If this repeat of the catch up process 51 is carried out, this repeat will correspond to the second stage 53 of the catch up process 51 of FIG. 4). When the second core 15b completes the repeat of the catch up process 51 (second stage 53 of the catch up process 51), the first core 15a again carries out a check to determine whether there are any sets 46 of inertial navigation data stored in the shared memory 15c which have not been used in the repeat of the catch up process 51, and responds to the results of this check in the same way as the previous check. The catch up process and check are repeated iteratively, with each repeat of the catch up process 51 being followed by a check for unused sets 46 of inertial navigation data stored in the shared memory 15c, until the check determines that there are no unused sets 46 of inertial navigation data stored in the shared memory 15c. This provides a catch up process 51 which extends indefinitely until all of the stored sets of inertial navigation data have been used. Provided that the catch up processing of each set of inertial navigation data requires a shorter time than the interval between successive sets 46 of inertial navigation data, the catch up process 51 will always eventually catch up and be completed.

This alternative embodiment may be advantageous in implementations where the time required for the second core 15b for processing and calculation 45 using the Kalman filter navigation algorithm, and to carry out any catch up process 51, and the timings of reception of new sets of inertial navigation data are not all known in advance, and/or are not sufficiently predictable that the required number of repetitions of the catch up process 51 can be determined in advance. This may be the case, for example, in examples where the navigation processor 15 may potentially be used with a range of different inertial navigation systems having different times between successive sets of measurements.

The embodiments described above operate in a navigation system 11 with a satellite navigation module 12 which provides sets of satellite navigation data which are valid at the time they are provided.

Figure 6:
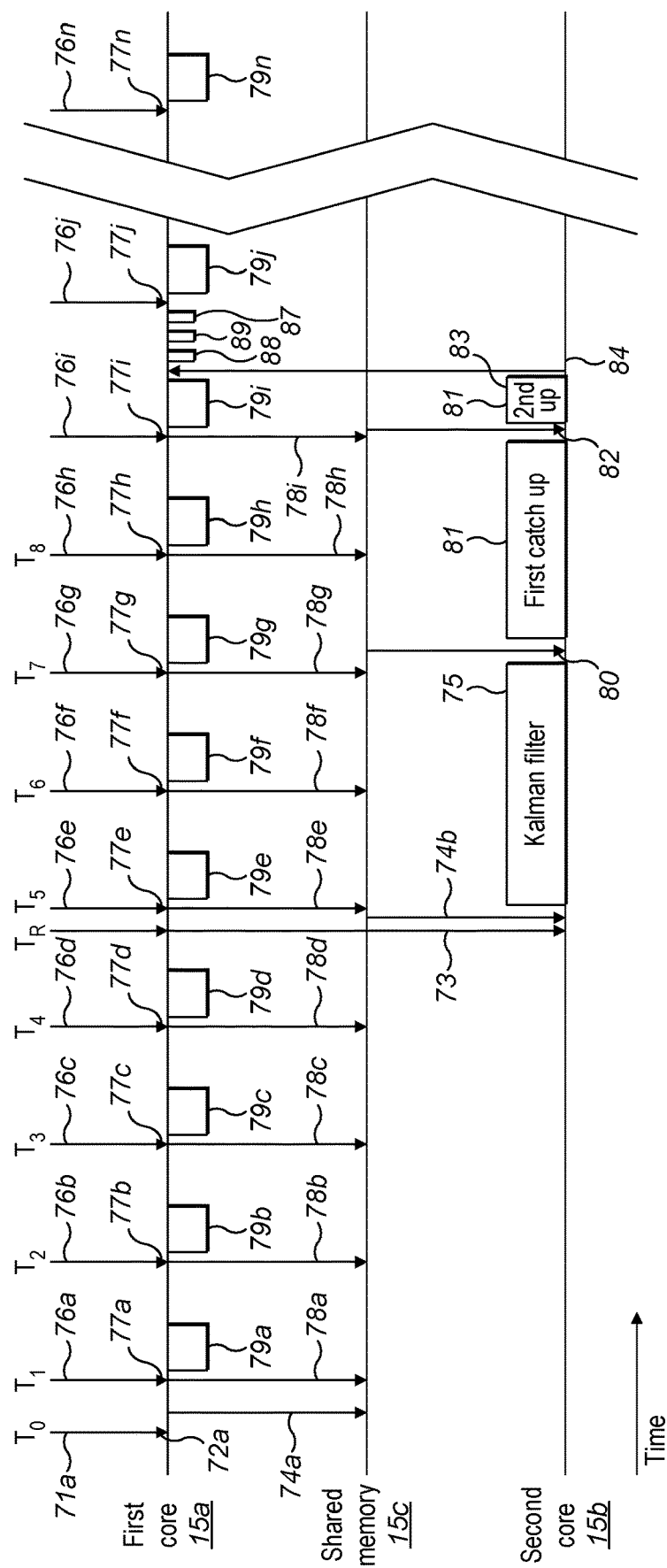
FIG. 6 is an explanatory diagram of operations carried out by the navigation processor in another alternative embodiment.

FIG. 6 is a diagram showing a timeline 70 of actions carried out by the components of the processor 15 in operation of a navigation system 11 in which the satellite navigation module 12 first identifies a first time at which a new set of satellite navigation data is valid, and then provides the corresponding new set of satellite navigation data at a second, later, time. For example, a C/A code GPS receiver may operate in this manner. FIG. 6 illustrates a situation where the navigation system 11 is already operating to generate a series of updated sets of position, velocity and attitude values for the vehicle 10.

As shown in FIG. 6, at a time $T_0$, the processor 15 receives 72a a message 71a indicating that a new set of satellite navigation data comprising GPS PVT data from the satellite navigation module 12 will be sent with a GPS timestamp at which the GPS PVT data is valid being $T_0$. The first core 15a then stores 74a a current position, velocity and attitude value for the vehicle 10 at time $T_0$ held by the first core 15a in the shared memory 15c for subsequent use by the Kalman filter navigation algorithm, as will be explained below. When the first core 15a receives 77a the next new set 76a of inertial navigation data at time $T_1$, the first core 15a stores 78a this new set 76a of inertial navigation data in the shared memory 15c. Further, the first core 15a uses the new set 76a of inertial navigation data, together with strapdown navigation equations and a current position, velocity and attitude value of the vehicle 10 held by the first core 15a to calculate 79a an updated new current position, velocity and attitude value of the vehicle 10, which is used to replace the previous current position and velocity value of the vehicle 10. As is explained above, FIG. 6 illustrates a situation where the navigation system 11 is already operating. Accordingly, the first core 15a has available a previously calculated current position, velocity and attitude value for the vehicle 10 based on a preceding set of inertial navigation data, and a set of strapdown navigation equations previously calculated based on the output of the Kalman filter navigation algorithm in a previous iteration of the method 20, based on the preceding received set of satellite navigation data.

Then, further new sets 76b, 76c, 76d of inertial navigation data from the inertial navigation module 12 are successively received by the processor 15 at respective times $T_2$, $T_3$, $T_4$ at 1 millisecond intervals before the new set of satellite navigation data is received. The first core 15a receives 77b, 77c, 77d each of the next new sets 76b, 76c, 76d of inertial navigation data at respective times $T_2$, $T_3$, $T_4$, and the first core 15a stores 78b, 78c, 78d these new sets 76b, 76c, 76d of inertial navigation data in the shared memory 15c similarly to the set 76a of inertial navigation data as described above. The first core 15a uses each new set 76b, 76c, 76d of inertial navigation data in turn, together with the strapdown navigation equations and the current position, velocity and attitude value of the vehicle 10 which was calculated using the previous set 76 of inertial navigation data, and held by the first core 15a, to iteratively calculate 79 an updated new current position, velocity and attitude value of the vehicle 10, which is used to replace the previous current position, velocity and attitude value of the vehicle 10 based on the previous set 66 of inertial navigation data.

Then, at a time $T_R$, the first core 15a of the processor 15 receives 72b a new set of satellite navigation data 71b comprising GPS PVT data from the satellite navigation module 12. This GPS PVT data being valid at time $T_0$. When the first core 15a receives 72b the new set of satellite navigation data 71a, the first core 15a forwards this new set of satellite navigation data 71b to the second core 15b. The first core 15a also instructs the second core 15b to update the Kalman filter navigation algorithm using the new set of satellite navigation data 71b.

When the second core 15b receives 73 the new set of satellite navigation data 71b forwarded from the first core 15a, and the instructions to proceed, the second core 15b obtains 74b the current position, velocity and attitude value for the vehicle 10 held by the first core 15a at time $T_0$ from the shared memory 15c, and then uses the Kalman filter navigation algorithm to process 75 the current (that is, most recently received) measured position and velocity of the vehicle 10 according to the new set 71b of satellite navigation data received at time $T_R$, the current position, velocity and attitude value for the vehicle 10 at time $T_0$, and an internal filter prediction of the position, velocity and attitude and uncertainty in position, velocity and attitude of the vehicle 10 produced in the preceding iteration of the Kalman filter navigation algorithm, to calculate an optimal estimate of the current position, velocity and attitude of the vehicle 10 and the uncertainty in the position, velocity and attitude of the vehicle 10. In the illustrated embodiment the Kalman filter states used comprise position, velocity and attitude, but many other states may be used in other examples.

In the illustrated example of FIG. 6, the processing and calculation 75 using the Kalman filter navigation algorithm by the second core 15b requires more time than the 1 millisecond between the generating of successive new sets of inertial navigation data by the inertial navigation module 12. Accordingly, new sets 76e, 76f, 76g of inertial navigation data from the inertial navigation module 12 are successively received by the processor 15 at respective times $T_5$, $T_6$, $T_7$ at 1 millisecond intervals, while the second core 15b is still processing 75 using the Kalman filter navigation algorithm. The first core 15a receives 77e, 77f, 77g each of the next new sets 76e, 76f, 76g of inertial navigation data at respective times $T_5$, $T_6$, $T_7$ and the first core 15a stores 78e, 78f, 78g these new sets 76e, 76f, 76g of inertial navigation data in the shared memory 15c similarly to the set 76a of inertial navigation data as described above. The first core 15a uses each successive new set 76e, 76f, 76g of inertial navigation data, together with the strapdown navigation equations and the current position, velocity and attitude value of the vehicle 10 which was calculated using the previous set 76 of inertial navigation data, and held by the first core 15a, to respectively calculate 79e, 79f, 79g an updated new current position, velocity and attitude value of the vehicle 10, which is iteratively used to replace the previous current position, velocity and attitude value of the vehicle 10 based on the previously received set 46 of inertial navigation data.

When the processing and calculation 75 using the Kalman filter navigation algorithm by the second core 15b is completed, so that the second core 15b has calculated an optimal estimate of the current position, velocity and attitude of the vehicle 10, the second core 15b obtains 80 from the shared memory 15c the stored sets 76a to 76g of inertial navigation data. The second core 15b then carries out a catch up process 81. The catch up process 81 is the same as the catch up process 51 described with reference to FIG. 4, except that the stored sets 76a to 76d of inertial navigation data received between the time $T_0$ of the GPS timestamp at which the GPS PVT data is valid and the time $T_R$ when the GPS PVT data is received are iteratively processed in addition to the sets 76e to 76g of inertial navigation data received while the processing and calculation 75 of the Kalman filter navigation algorithm is being carried out by the second core 15b.

Thus, the catch up process 71 ensures that the current position, velocity and attitude value of the vehicle 10 calculated by the second core 15b takes into account any sets 76 of inertial navigation data which are received during processing 75 of the Kalman filter navigation algorithm and also between the time $T_0$ when the GPS PVT data of the set of satellite navigation data 71b is valid and the time $T_R$ when it is received, so that the inertial navigation data in these "missed" set(s) of inertial navigation data is not lost.

In the illustrated example of FIG. 6, the second core 15b takes longer to carry out the first catch up process 71 than the time between completing the processing and calculation 75 using the Kalman filter navigation algorithm and the receiving 77 of one or more further new sets 76 of inertial navigation data from the inertial navigation module 12 by the first core 15a following the receiving 77g of the final set 76g of inertial navigation data received during the processing and calculation 75 using the Kalman filter navigation algorithm. Accordingly, when the next two successive new sets 77h and 47i of inertial navigation data from the inertial navigation module 12 are received by the processor 15 at respective times $T_8$ and $T_9$, the second core 15b is carrying out the catch up process 71. Accordingly, when the first core 15a receives 77h, 77i each of the new sets 76h, 76i of inertial navigation data at respective times $T_8$, $T_9$, the first core 15a stores 78h, 78i each of these new sets 76h, 76i of inertial navigation data in the shared memory 15c. The first core 15a also uses each successive new set 76h, 76i of inertial navigation data, together with the strapdown navigation equations and the current position, velocity and attitude value of the vehicle 10 which was calculated using the previous set 46 of inertial navigation data, and held by the first core 15a, to respectively calculate 79h and 79i an updated new current position, velocity and attitude value of the vehicle 10, which is used to replace the previous current position, velocity and attitude value of the vehicle 10 based on the previously received set 76 of inertial navigation data.

When the first catch up process 71 by the second core 15b is completed the second core 15b obtains 82 from the shared memory 15c the stored sets 76h and 76i of inertial navigation data. The second core 15b then carries out a second part 83 of the catch up process 81. In the second part 83 of the catch up process 81, the second core 15b iteratively uses the set of strapdown navigation equations and each successive set 86h and 86i of inertial navigation data to calculate a successive updated new current position, velocity and attitude value of the vehicle 10 from the current position, velocity and attitude value of the vehicle 10 calculated using the previous set 86 of inertial navigation data, until all of the stored sets 86h and 86i of inertial navigation data have been processed. As in the previous embodiments, the second part 83 of the catch up process 81 ensures that the current position and velocity value of the vehicle 10 calculated by the second core 15b takes into account any sets 76 of inertial navigation data which are received during the first catch up process 81, so that the inertial navigation data in these "missed" set(s) of inertial navigation data is not lost.

Although the catch up process 81 is shown in FIG. 6 as comprising a second part 83, it should be understood that this is only shown by way of example. There could be only a single, first part to the catch up process 81, or any required number of parts, similarly to the catch up process 51 described above with reference to FIGS. 4 and 5. Similarly to the catch up process 51, the catch up process 81 may be continued indefinitely until all stored sets 86 of inertial navigation data have been processed.

When the second core 15b has completed the second catch up process 83, the second core 15b sends the current position, velocity and attitude value 84 of the vehicle 10, which is based on the set 71b of satellite navigation data and has been updated to take into account all of the sets 76a to 76i of inertial navigation data received by the processor 15 since the time $T_0$ when the GPS PVT of the set 71b of satellite navigation data was valid, to the first core 15a. Further, because the set 71b of satellite navigation data is processed in the Kalman filter navigation algorithm together with the position, velocity and attitude value calculated using the strapdown navigation equations at the validity time $T_0$ of the satellite navigation data, the present disclosure may enable the satellite navigation data to be synchronised with the inertial navigation system data. Such time synchronisation of the different types of data is important because if the different data used is not related to the same time the movements of the vehicle 10 between the different times the different data relates to can introduce a lot of unknown errors in all navigation states, such as position, velocity and attitude in the illustrated embodiments, and also into the internal filter error states used in the Kalman filter calculations.

The output of the current position, velocity and attitude value 54 of the vehicle 10 from the second core 15b corresponds to the output of the catch up block 27 of the method 20 of FIG. 2. As is explained above, the current position, velocity and attitude value 54 of the vehicle 10 has been updated to take into account all inertial navigation data received during processing of the Kalman filter navigation algorithm, which may improve the accuracy and reliability of the current position and velocity value 54, and the stability of the Kalman filter navigation algorithm, for corresponding reasons to those explained above with reference to the previous embodiments.

When the first core 15a receives 86 the current position, velocity and attitude value 84 of the vehicle 10 from the second core 15b, the first core 15a uses this received current position, velocity and attitude value 54 of the vehicle 10 to replace 87 the current position, velocity and attitude value which has been iteratively calculated by the first core 15a using the sets 67a to 67i of inertial navigation data received by the first core 15a since time $T_0$. It will be understood that for the same reasons explained above, the received current position, velocity and attitude value 84 is more accurate and more reliable than the current position, velocity and attitude value held by the first core 15a. The receiving 86 of the current position, velocity and attitude value 84 of the vehicle 10 by the first core 15a corresponds to the start of the strapdown navigation block 23 of the method 20 of FIG. 2.

Subsequently, when further sets 76j to 76n of inertial navigation data are received 77j to 77n by the first core 15a, at respective times $T_{10}$ to $T_N$, the first core 15a iteratively updates the current position, velocity and attitude value of the vehicle 10 by using each successive new set 76j to 76n of inertial navigation data, together with the strapdown navigation equations, to iteratively respectively calculate 79j to 79n an updated new current position, velocity and attitude value, with the iterative updating starting from the received current position, velocity and attitude value 84 of the vehicle 10. This iterative updating continues until a new set of satellite navigation data is received by the processor 15, and the timeline 70 is then repeated for the new set of satellite navigation data. This iterative updating corresponds to the strapdown navigation block 23 of the method 20 of FIG. 2.

It will be understood from the preceding description that the method as a whole including the catch up process 81 ensures that the current position, velocity and attitude value of the vehicle 10 calculated by the second core 15b takes into account any sets 76 of inertial navigation data that are received between the time $T_0$ when the GPS PVT data of the set of satellite navigation data 71b is valid and the time $T_R$ when it is received, and any sets 76 of inertial navigation data which are received during the processing and calculation 84 of the Kalman filter navigation algorithm and also during the processing and calculation of the catch up process 81, so that the inertial navigation data in these possible "missed" set(s) of inertial navigation data is not lost. Accordingly, the reliability and accuracy of the successive updated estimates of the current position, velocity and attitude data of the vehicle 10 produced by the navigation system 11 may be improved.

Similarly to the embodiment of FIG. 4, during the illustrated method according to the timeline of FIG. 6, the first core 15a calculates acceleration demands required to manoeuvre the vehicle 10 towards a stored target based on the sequence of updated new current position, velocity and ettitude values of the vehicle 10 produced by the calculations 69. As is explained above with reference to the embodiment of FIG. 4, the reliability and accuracy of the successive updated estimates of the current position, velocity and attitude data of the vehicle 10 produced by the navigation system 11 may be improved by the embodiment of FIG. 6, so that the effectiveness of the acceleration demands in directing the vehicle 10 towards the stored target may be improved.

In the embodiment of FIG. 6, similarly to the embodiment of FIG. 4, when the first core 15a receives 86 the current position, velocity and attitude value 84 of the vehicle 10 from the second core 15b, the first core 15a may carry out a check 88 whether there are any sets 67 of inertial navigation data stored in the shared memory 15c which have not been used by the second core 15b in the catch up process 81. If the check 88 identifies that there is an unused set 67 of inertial navigation data stored in the shared memory 15c, the first core 15a uses this unused set 67 of inertial navigation data, together with the strapdown navigation equations and the current position, velocity and attitude value 84 of the vehicle 10 received 86 from the second core 15b, to calculate 89 an updated new current position, velocity and attitude value 90 of the vehicle 10. The first core 15a then uses this updated new current position, velocity and attitude value 90 of the vehicle 10, instead of the current position, velocity and attitude value 84 of the vehicle 10 received from the second core 15b, to replace 87 the current position, velocity and attitude value which has been iteratively calculated by the first core 15a using the sets 67a to 67i of inertial navigation data. In an alternative arrangement, the sequence of calculate 89 and replace 87 may be reversed, as explained in detail regarding the embodiment of FIG. 4.

In an alternative embodiment, similarly to the embodiment of FIG. 5, the second part 83 of the catch up process 81 may be omitted if this is not necessary. In other alternative embodiments, a third part of the catch up process 81, or further additional parts of the catch up process 81 may be carried out, as discussed above with reference to the embodiment of FIG. 4. In further alternative embodiments, checks may be carried out after the catch up process 81 to determine whether the catch up process 81 is required to be extended, as discussed above with reference to FIGS. 4 and 5.

In the embodiment of FIG. 6, the processor 15 first receives from the satellite navigation module 12 a message 71a indicating a time at which a new set of satellite navigation data will be valid, and later receives a message comprising the new set of satellite data. In the illustrated example the time at which the message 71a is received is the time at which the corresponding new set of satellite navigation data is valid. Accordingly, the time at which the new set of satellite navigation data will be valid is indicated by the receiving of the message 71a, and not by the content of the message 71a. In some alternative examples, the message 71a may include content specifying the time at which the corresponding new set of satellite navigation data is valid.

In some alternative examples, each new set of satellite data may be received together with an indication of a preceding validity time (that is, earlier than the reception time of the set of satellite data) at which it is valid. In such examples, the embodiment of FIG. 6 may be modified so that the first core 15a stores all received sets of inertial navigation data in the shared memory 15c to maintain a rolling buffer store of a predetermined number of the most recently received sets of inertial navigation data, for example by deleting the oldest set of inertial navigation data each time a new set is received. The predetermined number of the most recently received sets of inertial navigation data stored in this rolling buffer is selected such that, when a new set of satellite data is received together with an indication of a preceding validity time at which it is valid, the rolling buffer in the shared memory 15c will include at least all of the new sets of inertial navigation data received since the indicated validity time. The method of FIG. 6 can then be followed, with all of the new sets 76 of inertial navigation data received since the indicated validity time stored in the shared memory 15c being used to iteratively calculate and update the current position, velocity and attitude value of the vehicle 10 in the catch up process 81, so that that all of the stored sets 76 of inertial navigation data received between the time at which the new GPS PVT data is valid and the time when the GPS PVT data is received are iteratively processed in addition to the sets 76 of inertial navigation data received while the processing and calculation 75 of the Kalman filter navigation algorithm is being carried out by the second core 15b.

In some examples the predetermined number of the most recently received sets of inertial navigation data stored in this rolling buffer is selected such that, after a new set of satellite data is received together with an indication of a preceding validity time at which it is valid, when the subsequent calculation 75 of the Kalman filter navigation algorithm by the second core 15b is completed the rolling buffer in the shared memory 15c will include at least all of the new sets of inertial navigation data received since the indicated validity time.

The embodiments described above use a Kalman filter navigation algorithm which estimates position, velocity, and attitude states of a vehicle and estimates of related errors. In other examples alternative or additional different states of a vehicle and related errors may be estimated, as desired in any specific implementation. For example, if GPS data is received including range rates an additional time error state may be estimated.

The embodiments described above have new satellite navigation data received by the first core 15a and forwarded to the second core 15b. In alternative examples the new satellite navigation data could be received directly by the second core 15b.

The embodiments described above use a dual core processor 15. This is not essential. In some examples the first core 15a and second core 15b could be two cores of a multi-core processor having more than two cores. In such examples, functions of the first core 15a and/or second core 15b could each be split between several cores, with these several cores collectively being regarded as the first processing core or element, or the second processing core or element. Other functions may be carried out on other cores of the multi-core processor. In other alternative examples the functions of the first core 15a and the second core 15b described above could be carried out by separate processing elements such as separate processors, these separate processors could each be single or multi core processors.

In the embodiments described above, shared memory 15c is used. This is not essential, in other examples alternative arrangements may be used by the first core 15a and second core 15b to store and access data. However, without wishing to be bound by theory, it is expected that the use of shared memory will generally provide improved efficiency and/or speed of operation.

The relative timings of, and between, events described above and shown in the figures are by way of illustration and example only. In practice the relative timings may vary as required in any specific implementation. The timings may be determined by the timings of the satellite and inertial navigation modules used to provide the satellite navigation data and inertial navigation data.

The embodiments described above are used for navigation of an airborne vehicle. The use of the present disclosure is not limited to airborne vehicles, and can also be sued for other types of vehicle, such a waterborne vehicles, including submersible vehicles, and ground vehicles.

The embodiments described above are fully automatic. In some alternative examples a user or operator of the system may manually instruct some steps of the method to be carried out.

The acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously. This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is issued for designing silicon chips, or for configuring universal programmable chips, to carry out desired functions.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and Blu-ray® disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fibre optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

Further, to the extent that the term "includes" is used in either the detailed description or the claims, such term is intended to be inclusive in a manner similar to the term "comprising" as "comprising" is interpreted when employed as a transitional word in a claim.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. An iterative method for navigation of a vehicle, the method comprising:
at a first processing element:
receiving a set of satellite navigation data for the vehicle;
receiving a validity time of the set of satellite navigation data; and
receiving a series of sets of inertial navigation data each indicating acceleration and angular rate of the vehicle;
after the validity time, storing the received sets of inertial navigation data;
at a second processing element:
using a navigation filter algorithm, processing the received set of satellite navigation data together with a current position, velocity and attitude value of the vehicle and a prediction of error states made by the navigation filter algorithm in a previous iteration to generate an estimated position, velocity and attitude and a prediction of error states of the vehicle;
carrying out a catch up process comprising:
obtaining a stored series of one or more sets of inertial navigation data comprising one or more sets of inertial navigation data that were received between the validity time and completion of the processing of the received set of satellite navigation data;
using a set of inertial navigation data of the stored series that was a first set of inertial navigation data received after the validity time and the estimated position, velocity and attitude of the vehicle to calculate an updated position, velocity and attitude value of the vehicle; and
for any remaining sets of inertial navigation data of the stored series, in order of reception, iteratively using each set of inertial navigation data and the updated position, velocity and attitude value of the vehicle to calculate a new updated position, velocity and attitude value of the vehicle; and
sending the new updated position, velocity and attitude value of the vehicle to the first processing element;
at the first processing element, after receiving the new updated position, velocity and attitude value of the vehicle from the second processing element, for subsequently received sets of inertial navigation data, in order of reception, iteratively using each received set of inertial navigation data and the new updated position, velocity and attitude value of the vehicle to calculate a new updated position, velocity and attitude value of the vehicle;
using at least some of the new updated position, velocity and attitude values of the vehicle to generate commands to maneuver the vehicle;
wherein the new updated position, velocity and attitude value of the vehicle at the validity time is used as the current position, velocity and attitude value of the vehicle by the navigation filter algorithm.

2. The method of claim 1, further comprising, at the first processing element:
after the validity time, obtaining a previously calculated position, velocity and attitude value of the vehicle; and
for sets of inertial navigation data received after the validity time and before receiving the new updated position, velocity and attitude value of the vehicle from the second processing element, in order of reception, iteratively using each received set of inertial navigation data and the position, velocity and attitude value of the vehicle to calculate a new position, velocity and attitude value of the vehicle.

3. The method of claim 1, wherein storing the received sets of inertial navigation data continues during the catch up process; and
wherein the catch up process further comprises:
obtaining a further stored series of one or more sets of inertial navigation data comprising one or more sets of inertial navigation data that were received during the catch up process; and
for each set of inertial navigation data of the further stored series, in order of reception, iteratively using each set of inertial navigation data and the new updated position, velocity and attitude value of the vehicle to calculate a new updated position, velocity and attitude value of the vehicle.

4. The method of claim 3, further comprising:
during the catch up process, checking whether any further sets of inertial navigation data have been received during the catch up process; and
if any further sets of inertial navigation data have been received and not yet used to calculate a new updated position, velocity and attitude value of the vehicle, continuing the catch up process.

5. The method of claim 1, further comprising, at the first processing element:
after receiving the new updated position, velocity and attitude value of the vehicle from the second processing element, checking whether a set of inertial navigation data has been received since the new updated position, velocity and attitude value of the vehicle was sent by the second processing element; and
if such a set of inertial navigation data has been received, using this set of inertial navigation data and the received new updated position, velocity and attitude value of the vehicle to calculate a new updated position, velocity and attitude value of the vehicle.

6. The method of claim 2, wherein using at least some of the new updated position, velocity and attitude values of the vehicle to generate the commands to maneuver the vehicle comprises:
between the validity time and the first processing element receiving the new updated position, velocity and attitude value of the vehicle from the second processing element, using each new position, velocity and attitude value of the vehicle to generate first commands to maneuver the vehicle; and after the first processing element receives the new updated position, velocity and attitude value of the vehicle from the second processing element, using each new updated position, velocity and attitude value of the vehicle to generate second commands to maneuver the vehicle.

7. The method of claim 1, wherein the navigation filter algorithm comprises a square root filter or a Kalman filter.

8. The method of claim 1, wherein the satellite navigation data is GPS data.

9. The method of claim 1, wherein each set of inertial navigation data describes the acceleration of the vehicle in three orthogonal axes and angular rates of the vehicle about the three orthogonal axes.

10. The method of claim 1, wherein each new updated position, velocity and attitude value of the vehicle is calculated using strapdown navigation equations.

11. The method of claim 1, wherein the set of satellite navigation data is received at the validity time of the set of satellite navigation data.

12. The method of claim 1, wherein the vehicle is an airborne vehicle.

13. A method for navigation of a vehicle, the method comprising:
receiving a series of sets of satellite navigation data; and
iteratively repeating the method of claim 1 for each received set of satellite navigation data.

14. A vehicle navigation system comprising:
a first processing element and a second processing element;
wherein the first processing element is configured to:
receive a set of satellite navigation data for the vehicle;
receive a validity time of the set of satellite navigation data; and
receive a series of sets of inertial navigation data each indicating acceleration and angular rate of the vehicle;
wherein the system is configured to, after the validity time, store the received sets of inertial navigation data;
wherein the second processing element is configured to:
use a navigation filter algorithm to process the received set of satellite navigation data together with a current position, velocity and attitude value of the vehicle and a prediction of error states made by the navigation filter algorithm in a previous iteration to generate an estimated position, velocity and attitude and a prediction of error states of the vehicle;
carry out a catch up process in which the second processing element is configured to:
obtain a stored series of one or more sets of inertial navigation data comprising one or more sets of inertial navigation data that were received between the validity time and completion of the processing of the received set of satellite navigation data;
use a set of inertial navigation data of the stored series that was a first set of inertial navigation data received after the validity time and the estimated position, velocity and attitude of the vehicle to calculate an updated position, velocity and attitude value of the vehicle; and
for any remaining sets of inertial navigation data of the stored series, in turn, in order of reception, iteratively use each set of inertial navigation data and the updated position, velocity and attitude value of the vehicle to calculate a new updated position, velocity and attitude value of the vehicle; and send the new updated position, velocity and attitude value of the vehicle to the first processing element;

wherein the first processing element is further configured to, after receiving the new updated position, velocity and attitude value of the vehicle from the second processing element, for subsequently received sets of inertial navigation data, in order of reception, iteratively use each received set of inertial navigation data and the new updated position, velocity and attitude value of the vehicle to calculate a new updated position, velocity and attitude value of the vehicle;

wherein the system is further configured to use at least some of the new updated position, velocity and attitude values of the vehicle to generate commands to maneuver the vehicle; and wherein the new updated position, velocity and attitude value of the vehicle at the validity time is used as the current position, velocity and attitude value of the vehicle by the navigation filter algorithm.

15. The system of claim 14, wherein the first processing element is further configured to:
after the validity time, obtain a previously calculated position, velocity and attitude value of the vehicle; and
for sets of inertial navigation data received after the validity time and before receiving the new updated position, velocity and attitude value of the vehicle from the second processing element, in turn, in order of reception, iteratively use each received set of inertial navigation data and the position, velocity and attitude value of the vehicle to calculate a new position, velocity and attitude value of the vehicle.

16. The system of claim 14, wherein the system is further configured to continue to store the received sets of inertial navigation data during the catch up process; and
wherein the second processing element is further configured to:
obtain a further stored series of one or more sets of inertial navigation data comprising one or more sets of inertial navigation data that were received during the catch up process; and
for each set of inertial navigation data of the further stored series, in order of reception, iteratively use each set of inertial navigation data and the new updated position, velocity and attitude value of the vehicle to calculate a new updated position, velocity and attitude value of the vehicle.

17. The system of claim 14, wherein the set of satellite navigation data is received at the validity time of the set of satellite navigation data.

18. The system of claim 15, wherein the navigation filter algorithm comprises a square root filter or a Kalman filter.

19. An airborne weapon comprising:
a navigation system, the navigation system comprising a first processing element and a second processing element;
wherein the first processing element is configured to:
receive a set of satellite navigation data for the airborne weapon;
receive a validity time of the set of satellite navigation data; and
receive a series of sets of inertial navigation data each indicating acceleration and angular rate of the airborne weapon;
wherein the navigation system is configured to, after the validity time, store the received sets of inertial navigation data;
wherein the second processing element is configured to:
use a navigation filter algorithm to process the received set of satellite navigation data together with a current position, velocity and attitude value of the airborne weapon and a prediction of error states made by the navigation filter algorithm in a previous iteration to generate an estimated position, velocity and attitude and a prediction of error states of the airborne weapon;
carry out a catch up process in which the second processing element is configured to:
obtain a stored series of one or more sets of inertial navigation data comprising one or more sets of inertial navigation data that were received between the validity time and completion of the processing of the received set of satellite navigation data;
use a set of inertial navigation data of the stored series that was a first set of inertial navigation data received after the validity time and the estimated position, velocity and attitude of the airborne weapon to calculate an updated position, velocity and attitude value of the airborne weapon; and
for any remaining sets of inertial navigation data of the stored series, in order of reception, iteratively use each set of inertial navigation data and the updated position, velocity and attitude value of the airborne weapon to calculate a new updated position, velocity and attitude value of the airborne weapon; and
send the new updated position, velocity and attitude value of the airborne weapon to the first processing element;
wherein the first processing element is further configured to, after receiving the new updated position, velocity and attitude value of the airborne weapon from the second processing element, for subsequently received sets of inertial navigation data, in order of reception, iteratively use each received set of inertial navigation data and the new updated position, velocity and attitude value of the airborne weapon to calculate a new updated position, velocity and attitude value of the airborne weapon;
wherein the navigation system is further configured to use at least some of the new updated position, velocity and attitude values of the airborne weapon to generate commands to maneuver the airborne weapon; and
wherein the new updated position, velocity and attitude value of the airborne weapon at the validity time is used as the current position, velocity and attitude value of the airborne weapon by the navigation filter algorithm.

20. A non-transitory computer-readable medium comprising instructions that, when executed by a computer, cause the computer to carry out the method of claim 1.

* * * * *